(12) United States Patent
Enomoto

(10) Patent No.: US 7,177,096 B2
(45) Date of Patent: Feb. 13, 2007

(54) ZOOM LENS SYSTEM

(75) Inventor: Takashi Enomoto, Chiba (JP)

(73) Assignee: PENTAX Corporation

( * ) Notice: Subject to any disclaimer, the term of this patent is extended or adjusted under 35 U.S.C. 154(b) by 0 days.

(21) Appl. No.: 11/242,946

(22) Filed: Oct. 5, 2005

(65) Prior Publication Data

US 2006/0082897 A1   Apr. 20, 2006

(30) Foreign Application Priority Data

Oct. 7, 2004   (JP) ............................. 2004-295043

(51) Int. Cl.
*G02B 15/14*   (2006.01)
(52) U.S. Cl. ...................... 359/691; 359/683
(58) Field of Classification Search ................. 359/691
See application file for complete search history.

(56) References Cited

U.S. PATENT DOCUMENTS

| | | | |
|---|---|---|---|
| 5,910,860 | A | 6/1999 | Ozaki et al. |
| 6,025,961 | A | 2/2000 | Kohno et al. |
| 6,268,964 | B1 | 7/2001 | Ozaki et al. |
| 6,757,108 | B2 | 6/2004 | Sensui et al. |
| 6,917,477 | B2 * | 7/2005 | Takatsuki ................... 359/691 |

FOREIGN PATENT DOCUMENTS

| | | |
|---|---|---|
| JP | 10-274739 | 10/1998 |
| JP | 11-142734 | 5/1999 |
| JP | 2002-014284 | 1/2002 |

OTHER PUBLICATIONS

English Language Abstract of JP 10-274739.
English Language Abstract of JP 11-142734.

* cited by examiner

*Primary Examiner*—Ricky Mack
*Assistant Examiner*—William Choi
(74) *Attorney, Agent, or Firm*—Greenblum & Bernstein P.L.C.

(57) ABSTRACT

A zoom lens system includes a negative first lens group and a positive second lens group.

The negative first lens group includes a negative lens element and a positive lens element.

The positive second lens group includes a positive lens element, a negative lens element, and a positive lens element. At least the object-side positive lens element and the negative lens element are cemented together.

The zoom lens system of the present invention satisfies the following conditions:

$$1.5 < f_{2G}/(f_T f_W) < 3.0 \quad (1)$$

$$1 < f_{2G}(m_W - m_T)/(f_T f_W) < 3 \quad (2)$$

wherein
 $f_{2G}$: the focal length of the positive second lens group;
 $m_W$: the lateral magnification of the positive second lens group at the short focal length extremity; and
 $m_T$: the lateral magnification of the positive second lens group at the long focal length extremity;
 $f_T$: the focal length of the entire zoom lens system at the long focal length extremity; and
 $f_W$: the focal length of the entire zoom lens system at the short focal length extremity.

10 Claims, 19 Drawing Sheets

Fig. 1
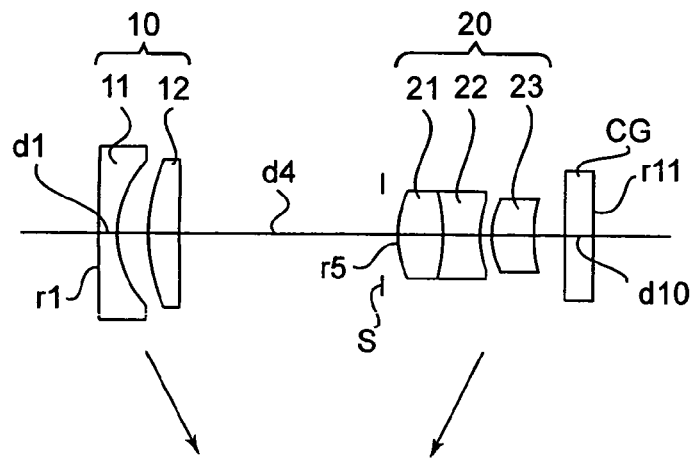
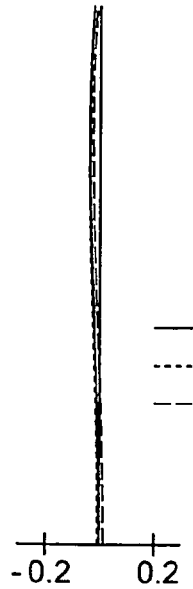
Fig. 2A
FNO=1:3.5
—— d Line
······· g Line
--- C Line
-0.2  0.2
SPHERICAL
ABERRATION
CHROMATIC
ABERRATION
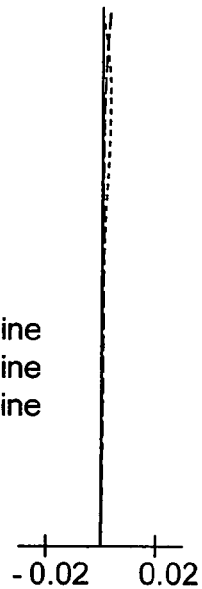
Fig. 2B
W=36.0°
-0.02  0.02
LATERAL
CHROMATIC
ABERRATION
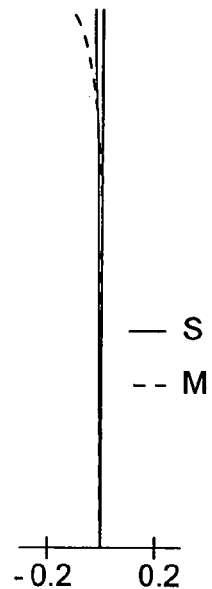
Fig. 2C
W=36.0°
—— S
-- M
-0.2  0.2
ASTIGMATISM
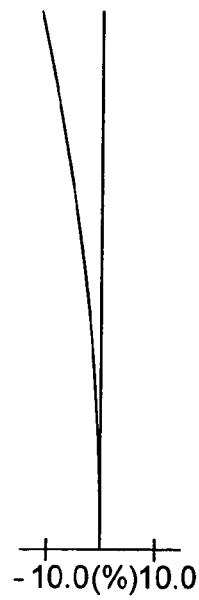
Fig. 2D
W=36.0°
-10.0(%)10.0
DISTORTION $F_{NO}=1:4.2$

SPHERICAL ABERRATION
CHROMATIC ABERRATION

—— d Line
······ g Line
– – – C Line $W=23.0°$

-0.02   0.02

LATERAL CHROMATIC ABERRATION $W=23.0°$

—— S
– – M

-0.2   0.2

ASTIGMATISM $W=23.0°$

-10.0(%)10.0

DISTORTION $F_{NO}=1:5.1$

—— d Line
······ g Line
– – – C Line

-0.2   0.2

SPHERICAL ABERRATION
CHROMATIC ABERRATION $W=16.2°$

-0.02   0.02

LATERAL CHROMATIC ABERRATION $W=16.2°$

—— S
– – M

-0.2   0.2

ASTIGMATISM $W=16.2°$

-10.0(%)10.0

DISTORTION

Fig.5
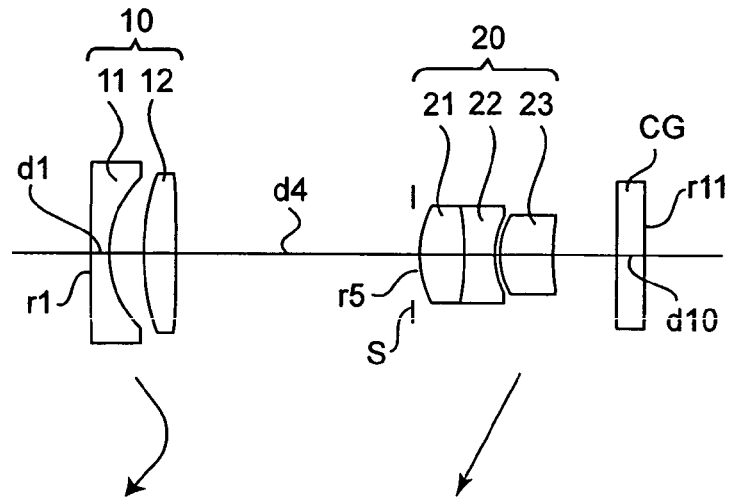
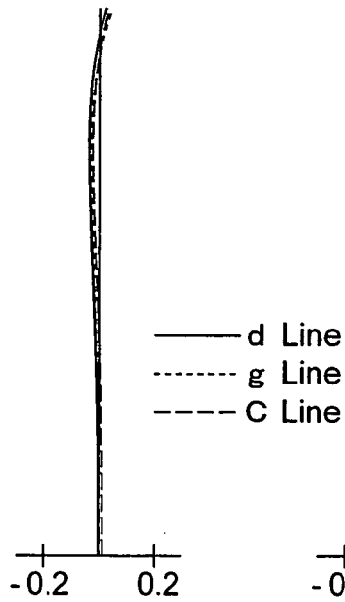
Fig.6A
FNO=1:3.5
—— d Line
········ g Line
---- C Line
-0.2   0.2
SPHERICAL
ABERRATION
CHROMATIC
ABERRATION
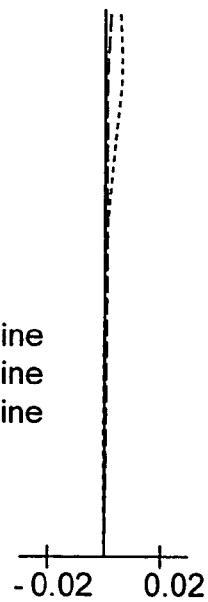
Fig.6B
W=35.4°
-0.02   0.02
LATERAL
CHROMATIC
ABERRATION
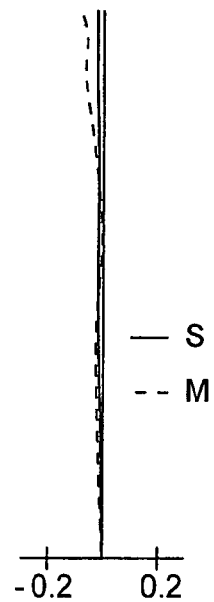
Fig.6C
W=35.4°
—— S
-- M
-0.2   0.2
ASTIGMATISM
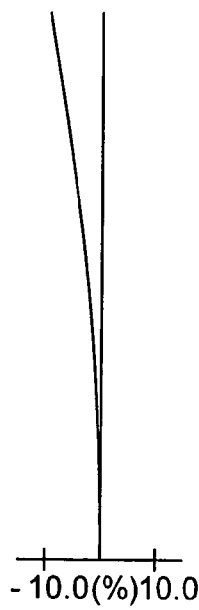
Fig.6D
W=35.4°
-10.0(%)10.0
DISTORTION

FNO=1:4.3

— d Line
······ g Line
--- C Line

-0.2　0.2

SPHERICAL ABERRATION
CHROMATIC ABERRATION

W=22.9°

-0.02　0.02

LATERAL CHROMATIC ABERRATION

W=22.9°

— S
-- M

-0.2　0.2

ASTIGMATISM

W=22.9°

-10.0(%)10.0

DISTORTION

FNO=1:6.0

— d Line
······ g Line
--- C Line

-0.2　0.2

SPHERICAL ABERRATION
CHROMATIC ABERRATION

W=13.0°

-0.02　0.02

LATERAL CHROMATIC ABERRATION

W=13.0°

— S
-- M

-0.2　0.2

ASTIGMATISM

W=13.0°

-10.0(%)10.0

DISTORTION

Fig.9
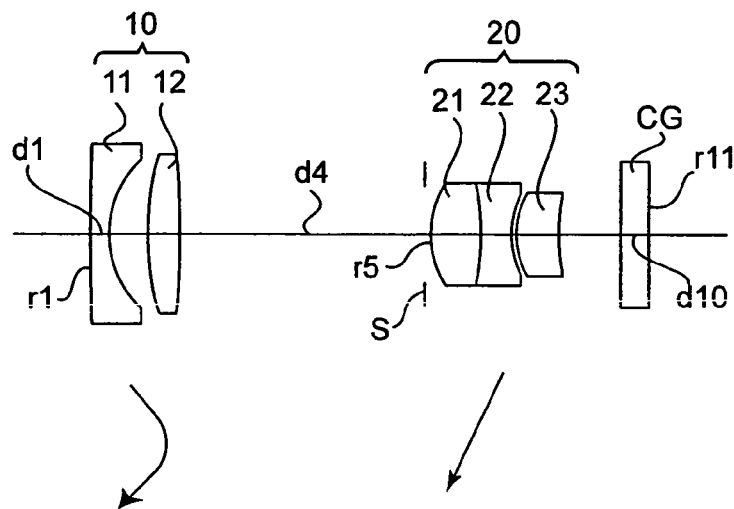
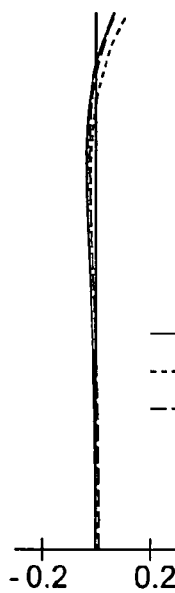
Fig.10A
$F_{NO}=1:3.4$
——— d Line
········ g Line
– – – C Line
-0.2  0.2
SPHERICAL
ABERRATION
CHROMATIC
ABERRATION
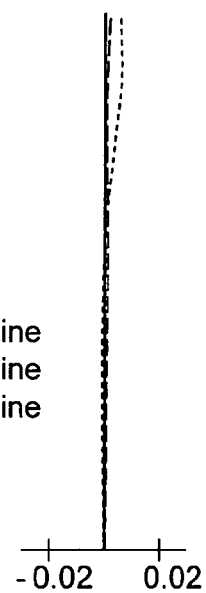
Fig.10B
W=35.9°
-0.02  0.02
LATERAL
CHROMATIC
ABERRATION
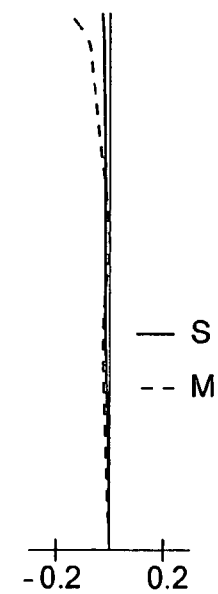
Fig.10C
W=35.9°
——— S
– – M
-0.2  0.2
ASTIGMATISM
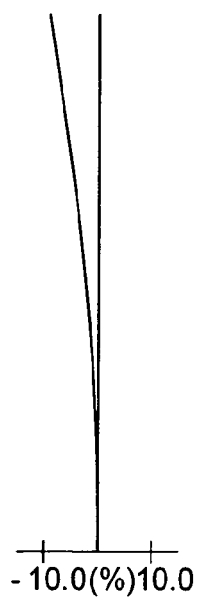
Fig.10D
W=35.9°
-10.0(%)10.0
DISTORTION

Fig.11A
F_NO=1:4.2
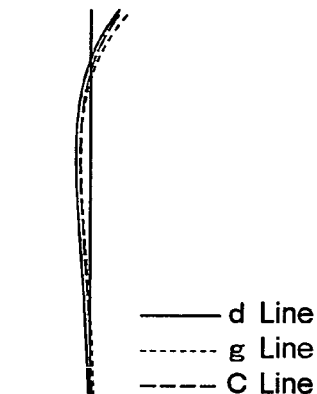
—— d Line
----- g Line
---- C Line
-0.2  0.2
SPHERICAL
ABERRATION
CHROMATIC
ABERRATION
Fig.11B
W=23.0°
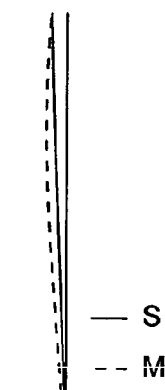
-0.02  0.02
LATERAL
CHROMATIC
ABERRATION
Fig.11C
W=23.0°
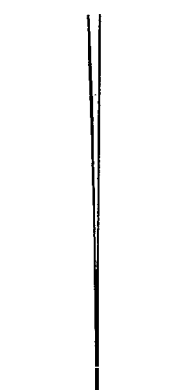
—— S
-- M
-0.2  0.2
ASTIGMATISM
Fig.11D
W=23.0°
-10.0(%)10.0
DISTORTION
Fig.12A
F_NO=1:6.1
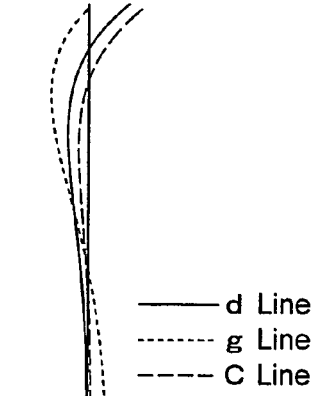
—— d Line
----- g Line
---- C Line
-0.2  0.2
SPHERICAL
ABERRATION
CHROMATIC
ABERRATION
Fig.12B
W=12.4°
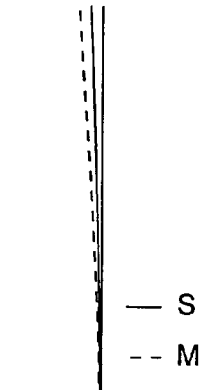
-0.02  0.02
LATERAL
CHROMATIC
ABERRATION
Fig.12C
W=12.4°
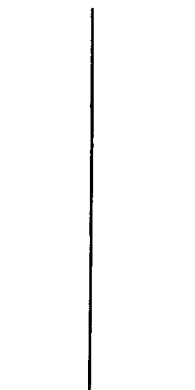
—— S
-- M
-0.2  0.2
ASTIGMATISM
Fig.12D
W=12.4°
-10.0(%)10.0
DISTORTION

Fig.13
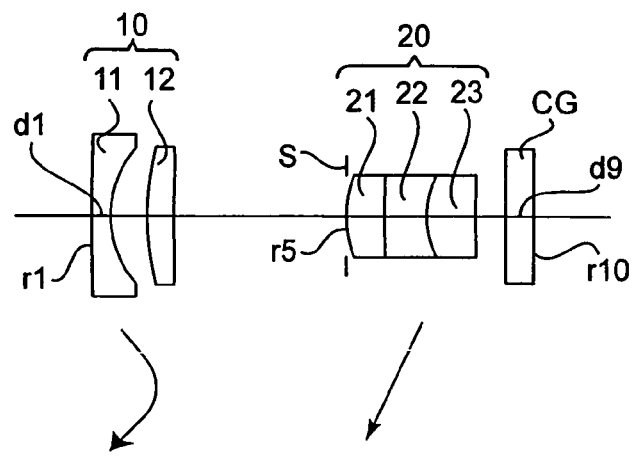
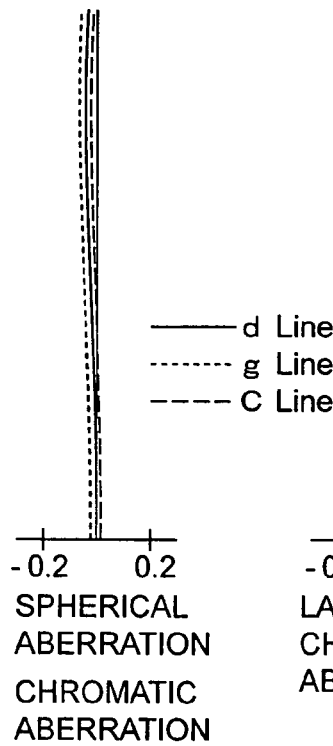
Fig.14A
FNO=1:3.5
——— d Line
········ g Line
– – – C Line
-0.2   0.2
SPHERICAL
ABERRATION
CHROMATIC
ABERRATION
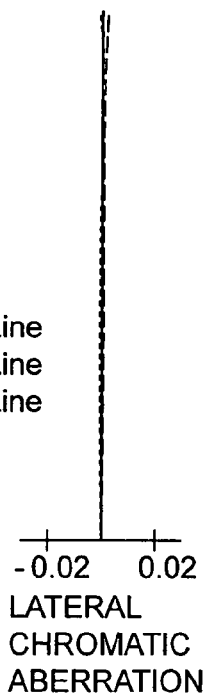
Fig.14B
W=35.8°
-0.02   0.02
LATERAL
CHROMATIC
ABERRATION
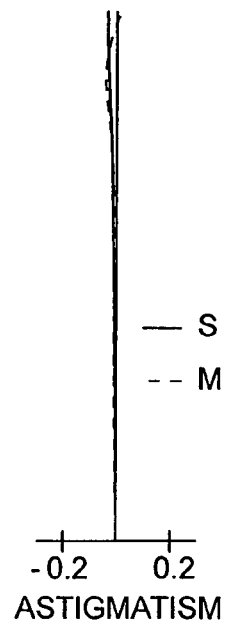
Fig.14C
W=35.8°
——— S
– – M
-0.2   0.2
ASTIGMATISM
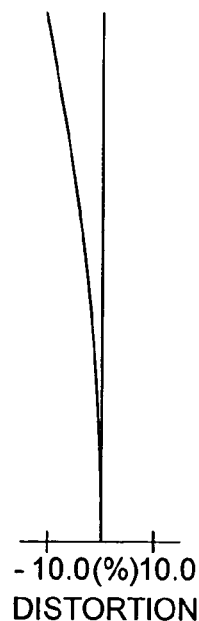
Fig.14D
W=35.8°
-10.0(%)10.0
DISTORTION

FNO=1:4.3

-0.2  0.2
SPHERICAL
ABERRATION
CHROMATIC
ABERRATION

— d Line
---- g Line
---- C Line

W=22.9°

-0.02  0.02
LATERAL
CHROMATIC
ABERRATION

W=22.9°

— S
-- M

-0.2  0.2
ASTIGMATISM

W=22.9°

-10.0(%)10.0
DISTORTION

FNO=1:5.2

-0.2  0.2
SPHERICAL
ABERRATION
CHROMATIC
ABERRATION

— d Line
---- g Line
---- C Line

W=16.2°

-0.02  0.02
LATERAL
CHROMATIC
ABERRATION

W=16.2°

— S
-- M

-0.2  0.2
ASTIGMATISM

W=16.2°

-10.0(%)10.0
DISTORTION

Fig. 17
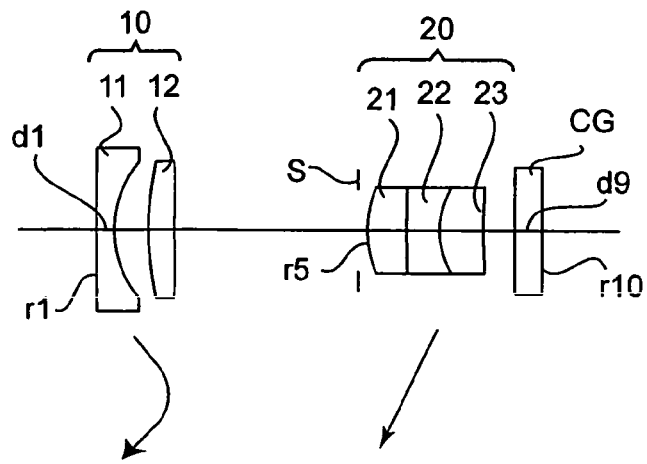
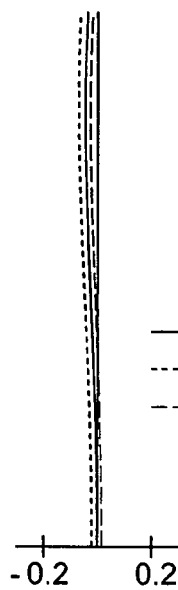
Fig. 18A
FNO=1:3.5
—— d Line
······ g Line
--- C Line
-0.2   0.2
SPHERICAL
ABERRATION
CHROMATIC
ABERRATION
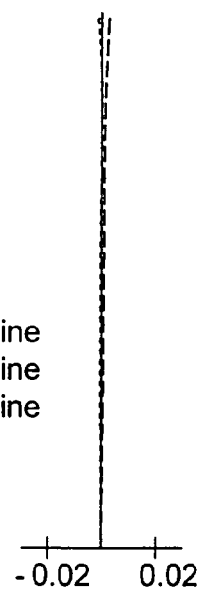
Fig. 18B
W=36.1°
-0.02   0.02
LATERAL
CHROMATIC
ABERRATION
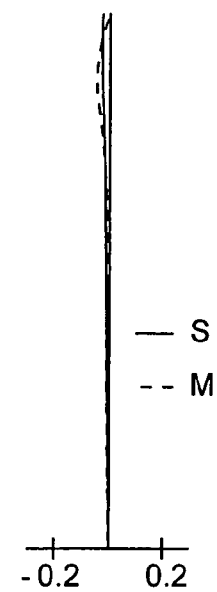
Fig. 18C
W=36.1°
— S
-- M
-0.2   0.2
ASTIGMATISM
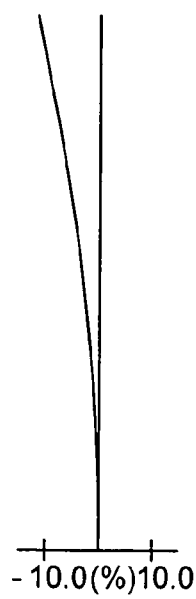
Fig. 18D
W=36.1°
-10.0(%) 10.0
DISTORTION

FNO=1:4.3

-0.2  0.2
SPHERICAL
ABERRATION
CHROMATIC
ABERRATION

—— d Line
------ g Line
---- C Line

W=23.0°

-0.02  0.02
LATERAL
CHROMATIC
ABERRATION

W=23.0°

-0.2  0.2
ASTIGMATISM

— S
-- M

W=23.0°

-10.0(%)10.0
DISTORTION

FNO=1:5.3

-0.2  0.2
SPHERICAL
ABERRATION
CHROMATIC
ABERRATION

—— d Line
------ g Line
---- C Line

W=15.5°

-0.02  0.02
LATERAL
CHROMATIC
ABERRATION

W=15.5°

-0.2  0.2
ASTIGMATISM

— S
-- M

W=15.5°

-10.0(%)10.0
DISTORTION

Fig.21
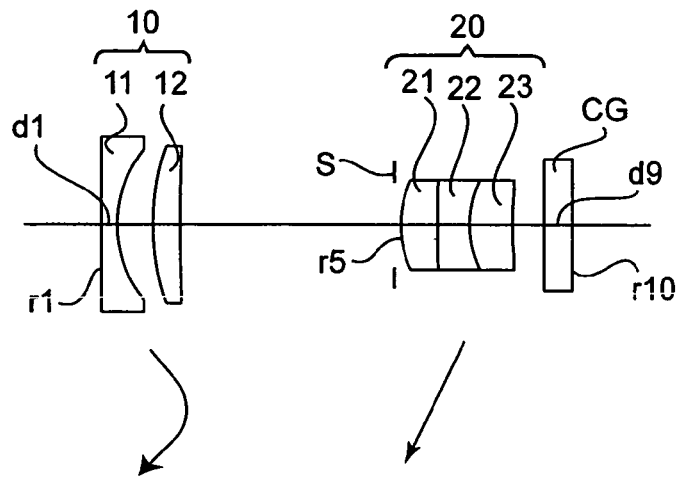
Fig.22A
FNO=1:3.7
— d Line
----- g Line
---- C Line
-0.2  0.2
SPHERICAL
ABERRATION
CHROMATIC
ABERRATION
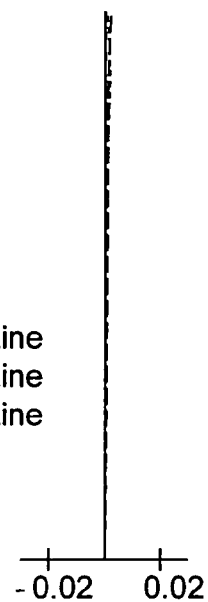
Fig.22B
W=34.6°
-0.02  0.02
LATERAL
CHROMATIC
ABERRATION
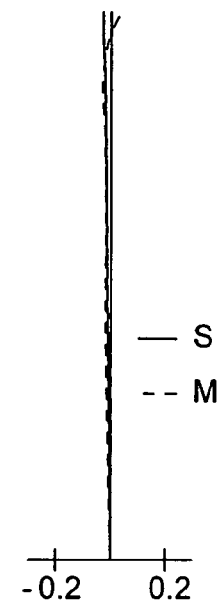
Fig.22C
W=34.6°
— S
-- M
-0.2  0.2
ASTIGMATISM
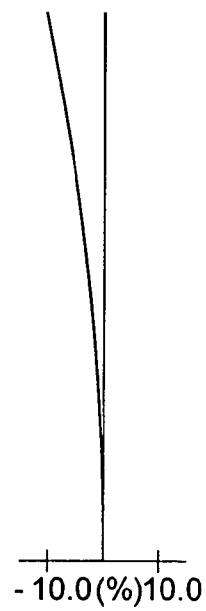
Fig.22D
W=34.6°
-10.0(%)10.0
DISTORTION

Fig.23A
F$_{NO}$=1:4.4
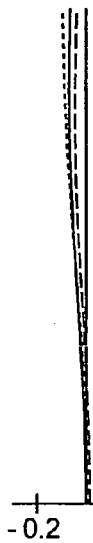
-0.2  0.2
SPHERICAL
ABERRATION
CHROMATIC
ABERRATION
— d Line
······ g Line
---- C Line
Fig.23B
W=23.0°
-0.02  0.02
LATERAL
CHROMATIC
ABERRATION
Fig.23C
W=23.0°
-0.2  0.2
ASTIGMATISM
— S
-- M
Fig.23D
W=23.0°
-10.0(%)10.0
DISTORTION
Fig.24A
F$_{NO}$=1:5.9
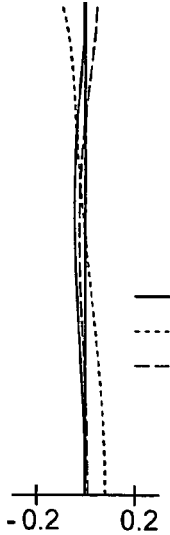
-0.2  0.2
SPHERICAL
ABERRATION
CHROMATIC
ABERRATION
— d Line
······ g Line
---- C Line
Fig.24B
W=13.9°
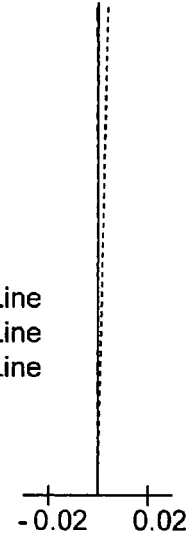
-0.02  0.02
LATERAL
CHROMATIC
ABERRATION
Fig.24C
W=13.9°
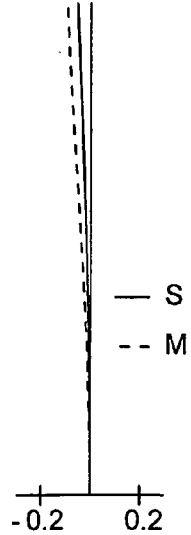
-0.2  0.2
ASTIGMATISM
— S
-- M
Fig.24D
W=13.9°
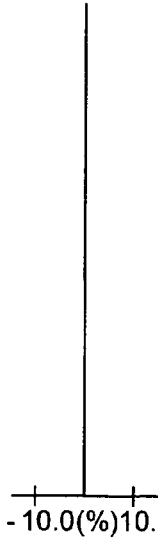
-10.0(%)10.0
DISTORTION

F_NO=1:3.5

——— d Line
·········· g Line
- - - - C Line

-0.2   0.2
SPHERICAL
ABERRATION
CHROMATIC
ABERRATION

W=36.5°

-0.02   0.02
LATERAL
CHROMATIC
ABERRATION

W=36.5°

——— S
- - M

-0.2   0.2
ASTIGMATISM

W=36.5°

-10.0(%)10.0
DISTORTION

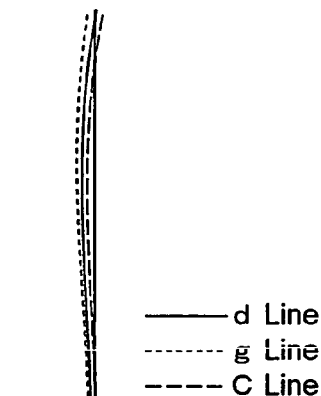
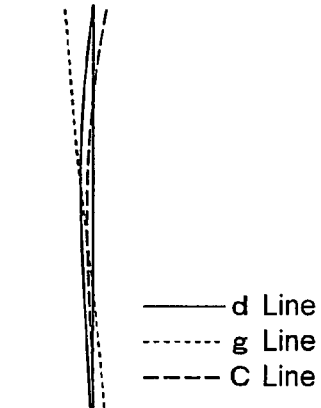

FNO=1:3.5

—— d Line
------ g Line
---- C Line

-0.2  0.2

SPHERICAL
ABERRATION
CHROMATIC
ABERRATION

W=35.4°

-0.02  0.02

LATERAL
CHROMATIC
ABERRATION

W=35.4°

—— S
-- M

-0.2  0.2

ASTIGMATISM

W=35.4°

-10.0(%)10.0

DISTORTION

FNO=1:4.2

-0.2  0.2
SPHERICAL
ABERRATION
CHROMATIC
ABERRATION

— d Line
······ g Line
---- C Line

W=23.1°

-0.02  0.02
LATERAL
CHROMATIC
ABERRATION

W=23.1°

-0.2  0.2
ASTIGMATISM

— S
-- M

W=23.1°

-10.0(%)10.0
DISTORTION

FNO=1:6.7

-0.2  0.2
SPHERICAL
ABERRATION
CHROMATIC
ABERRATION

— d Line
······ g Line
---- C Line

W=11.9°

-0.02  0.02
LATERAL
CHROMATIC
ABERRATION

W=11.9°

-0.2  0.2
ASTIGMATISM

— S
-- M

W=11.9°

-10.0(%)10.0
DISTORTION

FNO=1:3.5

—— d Line
······ g Line
---- C Line

-0.2  0.2
SPHERICAL
ABERRATION
CHROMATIC
ABERRATION

W=34.1°

-0.02  0.02
LATERAL
CHROMATIC
ABERRATION

W=34.1°

—— S
-- M

-0.2  0.2
ASTIGMATISM

W=34.1°

-10.0(%)10.0
DISTORTION

Fig.35A
FNO=1:4.2
Fig.35B
W=23.0°
Fig.35C
W=23.0°
Fig.35D
W=23.0°
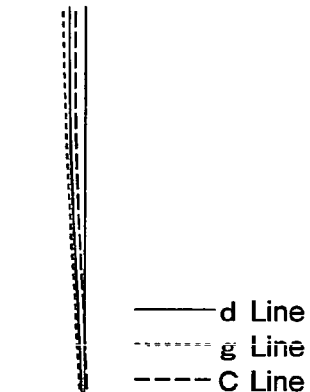
—— d Line
······ g Line
---- C Line
—— S
-- M
-0.2   0.2
SPHERICAL
ABERRATION
CHROMATIC
ABERRATION
-0.02   0.02
LATERAL
CHROMATIC
ABERRATION
-0.2   0.2
ASTIGMATISM
-10.0(%)10.0
DISTORTION
Fig.36A
FNO=1:6.7
Fig.36B
W=11.6°
Fig.36C
W=11.6°
Fig.36D
W=11.6°
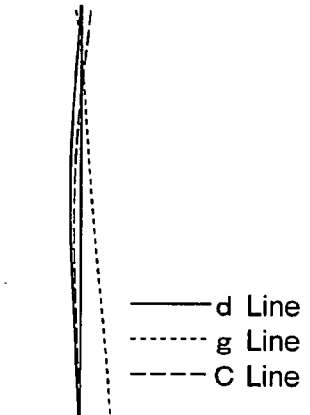
—— d Line
······ g Line
---- C Line
—— S
-- M
-0.2   0.2
SPHERICAL
ABERRATION
CHROMATIC
ABERRATION
-0.02   0.02
LATERAL
CHROMATIC
ABERRATION
-0.2   0.2
ASTIGMATISM
-10.0(%)10.0
DISTORTION

ZOOM LENS SYSTEM

BACKGROUND OF THE INVENTION

1. Field of the Invention

The present invention relates to a zoom lens system for a micro-miniaturized digital camera which is used in a camera-equipped cellular phone, and in a PDA (Personal Digital Assistant), etc.

2. Description of the Prior Art

A digital camera which forms an image on an imaging device is not only used as a camera itself, but also is accommodated in a cellular phone and a PDA, etc. Accordingly, an attempt has been made to both miniaturize the zoom lens system and to increase the number of pixels (higher definition) at the same time.

If a zoom lens system for a conventional imaging device with a sparse pixel arrangement is used with an imaging device with a dense (higher definition) pixel arrangement, the required optical performance cannot be achieved even in the case where the size of an image formed by the conventional imaging device with a sparse pixel arrangement is the same as the size of an image formed by the imaging device with a dense pixels arrangement.

For example, in the prior art, an imaging device with a diagonal image height of 2.0 mm (y=2.0 mm), which has mainly been used in a cellular phone, has been able to be used with a zoom lens system having three lens elements. However, it has been understood that a higher-definition imaging device in recent years cannot achieve sufficient optical performance with the zoom lens system of the three lens elements. A sufficient optical performance can of course be achieved if the zoom lens system is constituted by a larger number of lens elements, e.g., seven lens elements. On the other hand, a zoom lens system with such a large number of lens elements inevitably makes the overall length thereof longer, and cannot be mounted in a small gadget like a cellular phone.

SUMMARY OF THE INVENTION

The present invention provides a zoom lens system which can achieves the following:

(a) superior optical performance with a smaller number of lens elements, i.e., the number of lens elements and optical performance are well balanced; and (b) a zoom ratio of approximately 3.

The present invention is devised to obtain a zoom lens system which can be used with a high definition imaging device which has a diagonal image height (y) of 3.0 mm, and has about 3 mega-pixels.

For the above purposes, the zoom lens system of the present invention is constituted by five lens elements, which are relatively smaller number of lens elements compared with the prior art; and the zoom lens system is formed as a negative-lead type zoom lens system. More specifically, the five lens elements are divided into two lens groups i.e., a first lens group having a negative refractive power (hereinafter, a negative first lens group), and a second lens group having a positive refractive power (hereinafter, a positive second lens group), in this order from the object. Thereafter, the lens arrangement of each lens group can be suitably determined upon design requirements.

According to an aspect of the present invention, there is provided a zoom lens system including a negative first lens group and a positive second lens group, in this order from the object.

The negative first lens group includes a negative lens element and a positive lens element, in this order from the object.

The positive second lens group includes a positive lens element, a negative lens element, and a positive lens element, in this order from the object. At least the object-side positive lens element and the negative lens element are cemented.

The zoom lens system of the present invention satisfies the following conditions:

$$1.5 < f_{2G}/(f_T f_W) < 3.0 \quad (1)$$

$$1 < f_{2G}(m_W - m_T)/(f_T f_W) < 3 \quad (2)$$

wherein $f_{2G}$ designates the focal length of the positive second lens group;

$m_W$ designates the lateral magnification of the positive second lens group at the short focal length extremity;

$m_T$ designates the lateral magnification of the positive second lens group at the long focal length extremity;

$f_T$ designates the focal length of the entire zoom lens system at the long focal length extremity; and $f_W$ designates the focal length of the entire zoom lens system at the short focal length extremity.

The zoom lens system preferably satisfies the following condition:

$$1.0 < |f_{1G}|/f_{2G} < 1.6 \quad (3)$$

wherein $f_{1G}$ designates the focal length of the negative first lens group; and $f_{2G}$ designates the focal length of the positive second lens group.

The zoom lens system preferably satisfies the following condition:

$$15 < \nu p - \nu n \quad (4)$$

wherein $\nu p$ designates the Abbe number of the image-side positive lens element of the positive second lens group; and $\nu n$ designates the Abbe number of the negative lens element of the positive second lens group.

The zoom lens system preferably satisfies the following condition:

$$18° < \beta_W < 25° \quad (5)$$

wherein $\beta_W$ designates an exit angle, at the short focal length extremity, formed by the optical axis and the light ray closest thereto, in a bundle of off-axis light rays, which is emitted from the most image-side lens surface and corresponds to the highest image height.

The zoom lens system preferably satisfies the following condition:

$$\beta_W - \beta_T < 10° \quad (6)$$

wherein $\beta_W$ designates an exit angle, at the short focal length extremity, formed by the optical axis and the light ray closest thereto, in a bundle of off-axis light rays, which is emitted from the most image-side lens surface of the zoom lens system and corresponds to the highest image height; and $\beta_T$ designates an exit angle, at the long focal length extremity, formed by the optical axis and the light ray closest thereto, in a bundle of off-axis light rays, which is emitted from the most image-side lens surface of the zoom lens system and corresponds to the highest image height.

In the positive second lens group of the zoom lens system, the object-side positive lens element and the negative lens element can be formed as cemented lens elements, or all the three lens elements can be formed as cemented lens elements.

In the case where all the three lens elements are cemented, the positive second lens group preferably satisfies the following condition:

$$(N_n - N_p)/r_{c2} < 0.1 \quad (7)$$

wherein $N_n$ designates the refractive index of the d-line with respect to the negative lens element of the positive second lens group;

$N_p$ designates the refractive index of the d-line with respect to the image-side positive lens element of the positive second lens group; and $r_{c2}$ designates the radius of curvature of the cemented surface between the negative lens element and the image-side positive lens element of the positive second lens group.

Also, in the case where all the three lens elements are cemented, the object-side positive lens element and the negative lens element preferably satisfy the following condition:

$$0 < r_{c1} \quad (8)$$

wherein $r_{c1}$ designates the radius of curvature of the cemented surface between the object-side positive lens element and the negative lens element of the positive second lens group.

Furthermore, in the case where all the three lens elements are cemented, the positive second lens group of the zoom lens system preferably satisfies the following condition:

$$20 < \nu p - \nu n \quad (4')$$

$\nu p$ designates the Abbe number of the image-side positive lens element of the positive second lens group; and $\nu n$ designates the Abbe number of the negative lens element of the positive second lens group.

In the case where all the three lens elements are cemented, the correcting of aberrations can be easily performed in all the zooming ranges of the zoom lens system satisfying the following condition:

$$2.8 < f_T/f_W \quad (9)$$

wherein $f_T$ designates the focal length of the entire zoom lens system at the long focal length extremity; and $f_W$ designates the focal length of the entire zoom lens system at the short focal length extremity.

Still further, in the case where all the three lens elements are cemented, the zoom lens system preferably satisfies the following condition:

$$3° < \beta_W - \beta_T < 10° \quad (6')$$

wherein $\beta_W$ designates an exit angle, at the short focal length extremity, formed by the optical axis and the light ray closest thereto, in a bundle of off-axis light rays, which is emitted from the most image-side lens surface of the zoom lens system and corresponds to the highest image height; and $\beta_T$ designates an exit angle, at the long focal length extremity, formed by the optical axis and the light ray closest thereto, in a bundle of off-axis light rays, which is emitted from the most image-side lens surface of the zoom lens system and corresponds to the highest image height.

The present disclosure relates to subject matter contained in Japanese Patent Application No. 2004-295043 (filed on Oct. 7, 2004) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the zoom lens system according to a first embodiment of the present invention;

FIGS. 2A, 2B, 2C and 2D show aberrations occurred in the lens arrangement shown in FIG. 1, at the short focal length extremity;

FIG. 5 is a lens arrangement of the zoom lens system according to a second embodiment of the present invention;

FIGS. 6A, 6B, 6C and 6D show aberrations occurred in the lens arrangement shown in FIG. 5, at the short focal length extremity;

FIG. 9 is a lens arrangement of the zoom lens system according to a third embodiment of the present invention;

FIGS. 10A, 10B, 10C and 10D show aberrations occurred in the lens arrangement shown in FIG. 9, at the short focal length extremity;

FIGS. 11A, 11B, 11C and 11D show aberrations occurred in the lens arrangement shown in FIG. 9, at an intermediate focal length;

FIGS. 12A, 12B, 12C and 12D show aberrations occurred in the lens arrangement shown in FIG. 9, at the long focal length extremity;

FIG. 13 is a lens arrangement of the zoom lens system according to a fourth embodiment of the present invention;

FIGS. 14A, 14B, 14C and 14D show aberrations occurred in the lens arrangement shown in FIG. 13, at the short focal length extremity;

FIG. 17 is a lens arrangement of the zoom lens system according to a fifth embodiment of the present invention;

FIGS. 18A, 18B, 18C and 18D show aberrations occurred in the lens arrangement shown in FIG. 17, at the short focal length extremity;

FIG. 21 is a lens arrangement of the zoom lens system according to a sixth embodiment of the present invention;

FIGS. 22A, 22B, 22C and 22D show aberrations occurred in the lens arrangement shown in FIG. 21, at the short focal length extremity;

FIGS. 23A, 23B, 23C and 23D show aberrations occurred in the lens arrangement shown in FIG. 21, at an intermediate focal length;

FIGS. 24A, 24B, 24C and 24D show aberrations occurred in the lens arrangement shown in FIG. 21, at the long focal length extremity;

FIGS. 27A, 27B, 27C and 27D show aberrations occurred in the lens arrangement shown in FIG. 25, at an intermediate focal length;

FIGS. 28A, 28B, 28C and 28D show aberrations occurred in the lens arrangement shown in FIG. 25, at the long focal length extremity;

FIGS. 35A, 35B, 35C and 35D show aberrations occurred in the lens arrangement shown in FIG. 33, at an intermediate focal length;

FIGS. 36A, 36B, 36C and 36D show aberrations occurred in the lens arrangement shown in FIG. 33, at the long focal length extremity.

DESCRIPTION OF THE PREFERRED EMBODIMENTS

Figure 3A:
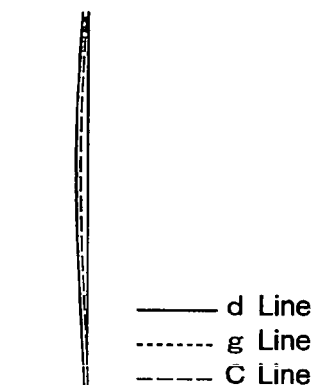
FIGS. 3A, 3B, 3C and 3D show aberrations occurred in the lens arrangement shown in FIG. 1, at an intermediate focal length.
Figure 3B:
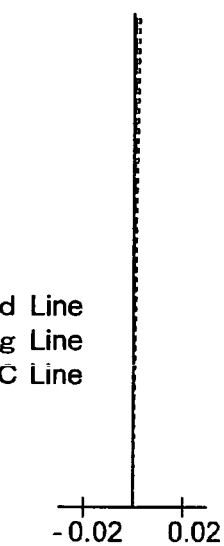
Figure 3C:
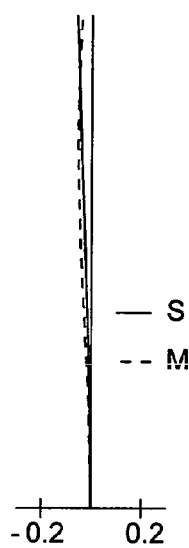
Figure 3D:
Figure 4A:
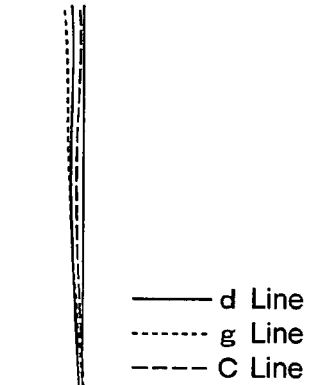
FIGS. 4A, 4B, 4C and 4D show aberrations occurred in the lens arrangement shown in FIG. 1, at the long focal length extremity.
Figure 4B:
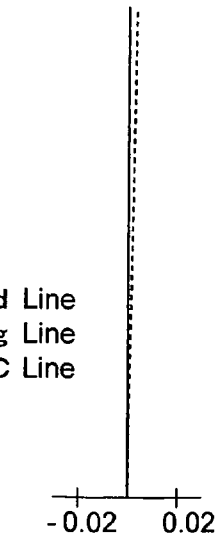
Figure 4C:
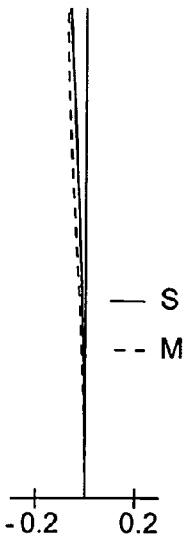
Figure 4D:
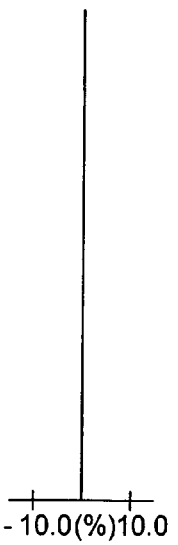
Figure 7A:
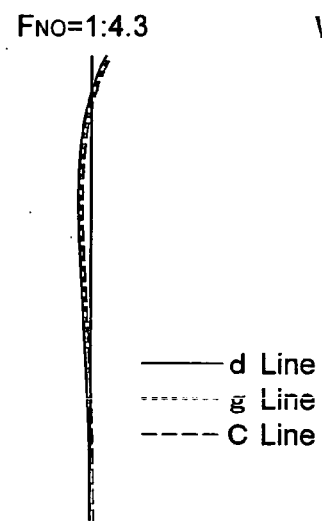
FIGS. 7A, 7B, 7C and 7D show aberrations occurred in the lens arrangement shown in FIG. 5, at an intermediate focal length.
Figure 7B:
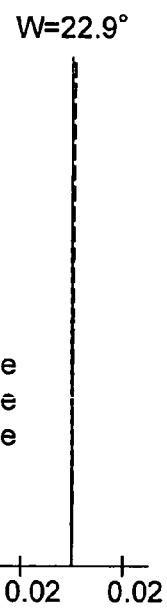
Figure 7C:
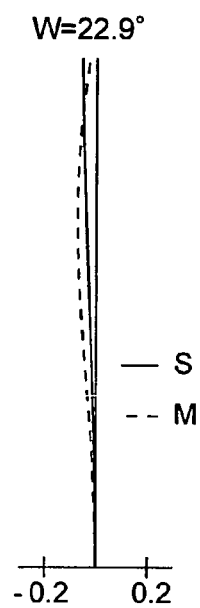
Figure 7D:
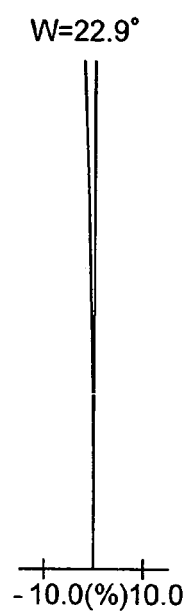
Figure 8A:
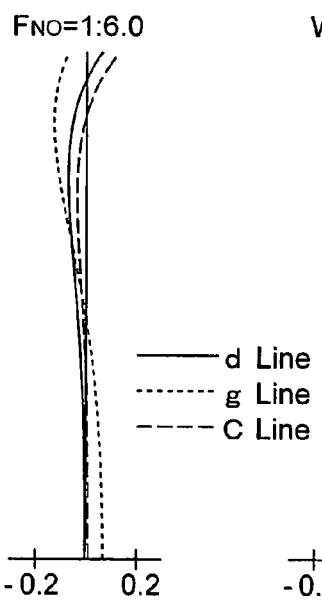
FIGS. 8A, 8B, 8C and 8D show aberrations occurred in the lens arrangement shown in FIG. 5, at the long focal length extremity.
Figure 8B:
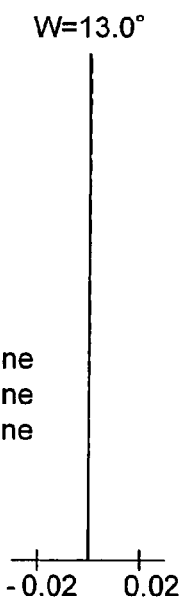
Figure 8C:
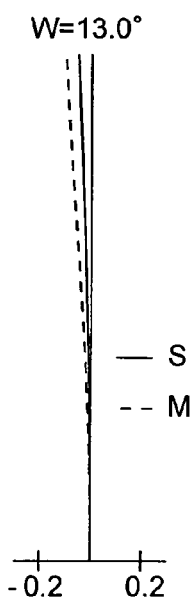
Figure 8D:
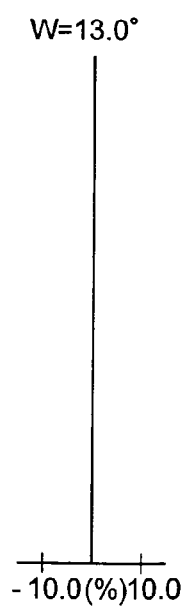
Figure 15A:
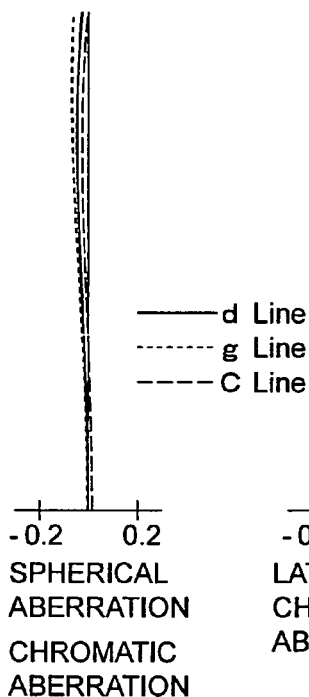
FIGS. 15A, 15B, 15C and 15D show aberrations occurred in the lens arrangement shown in FIG. 13, at an intermediate focal length.
Figure 15B:
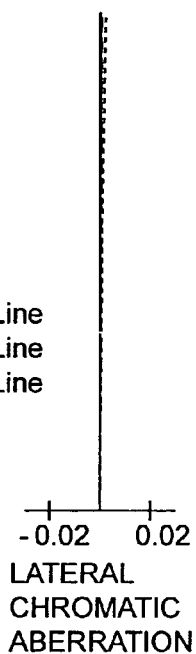
Figure 15C:
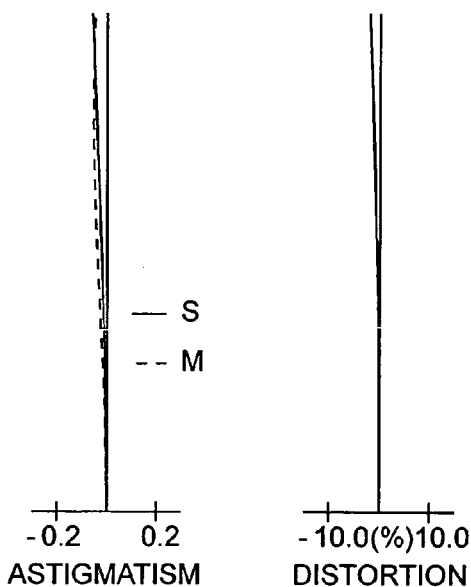
Figure 15D:
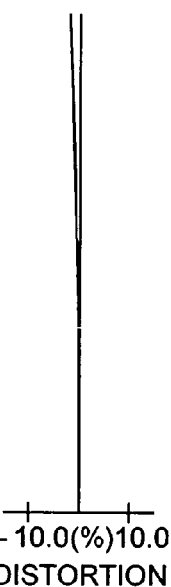
Figure 16A:
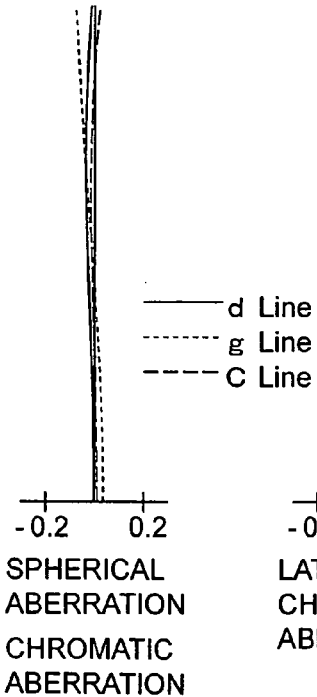
FIGS. 16A, 16B, 16C and 16D show aberrations occurred in the lens arrangement shown in FIG. 13, at the long focal length extremity.
Figure 16B:
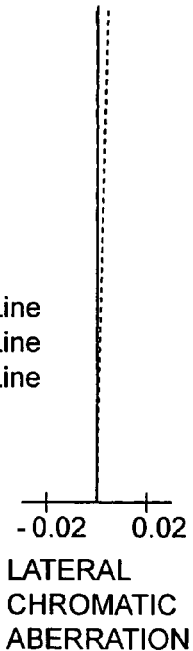
Figure 16C:
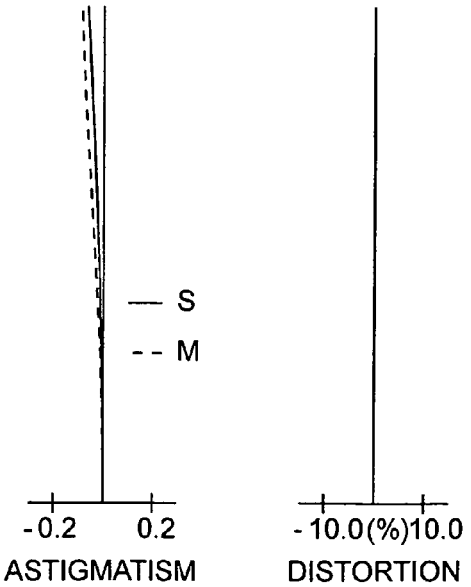
Figure 16D:
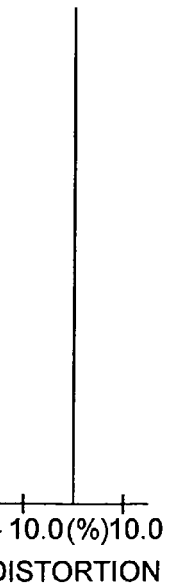
Figure 19A:
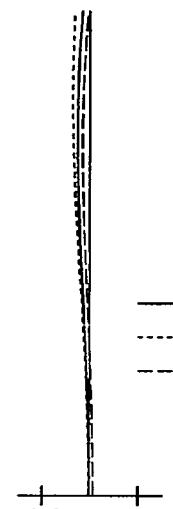
FIGS. 19A, 19B, 19C and 19D show aberrations occurred in the lens arrangement shown in FIG. 17, at an intermediate focal length.
Figure 19B:
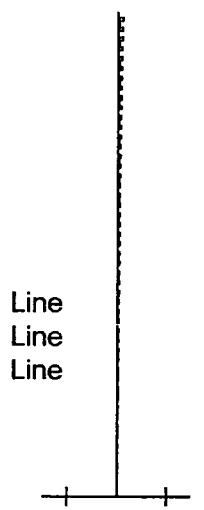
Figure 19C:
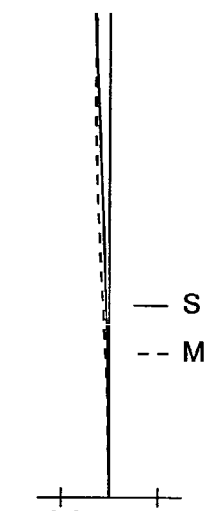
Figure 19D:
Figure 20A:
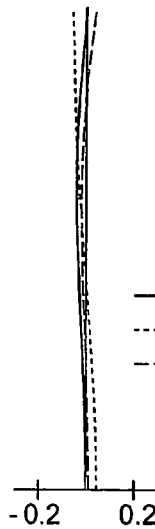
FIGS. 20A, 20B, 20C and 20D show aberrations occurred in the lens arrangement shown in FIG. 17, at the long focal length extremity.
Figure 20B:
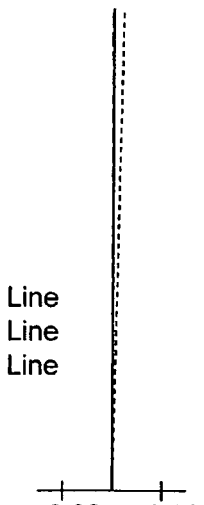
Figure 20C:
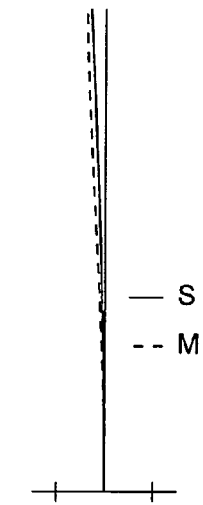
Figure 20D:
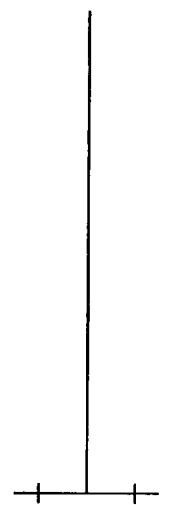
Figure 25:
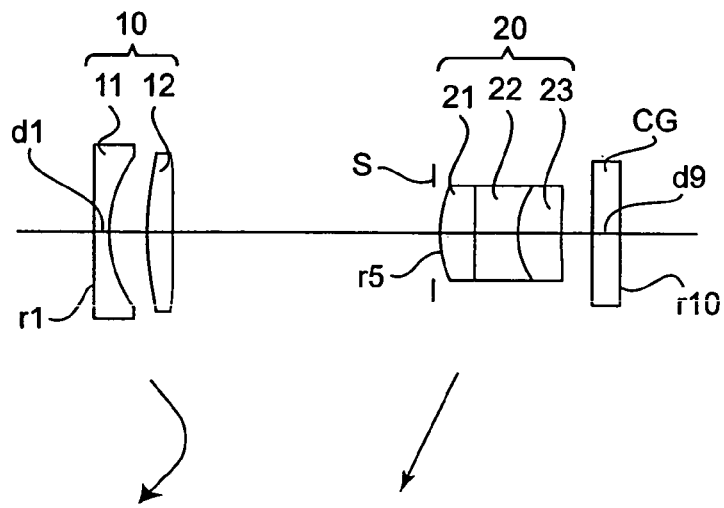
FIG. 25 is a lens arrangement of the zoom lens system according to a seventh embodiment of the present invention.
Figure 26A:
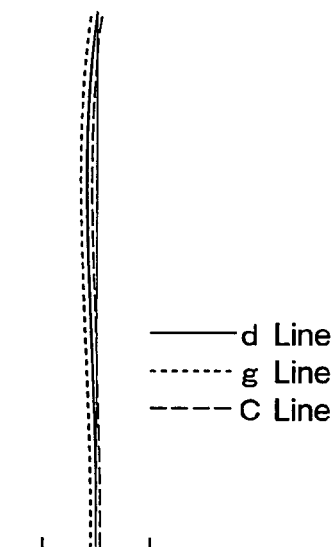
FIGS. 26A, 26B, 26C and 26D show aberrations occurred in the lens arrangement shown in FIG. 25, at the short focal length extremity.
Figure 26B:
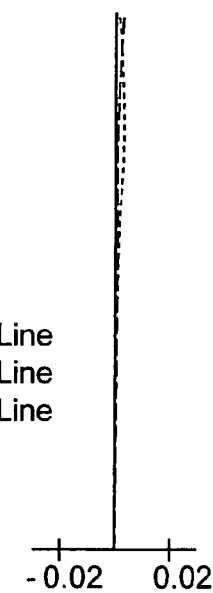
Figure 26C:
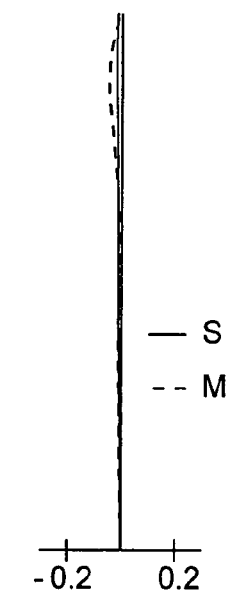
Figure 26D:
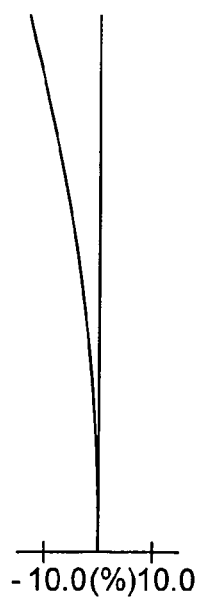
Figure 29:
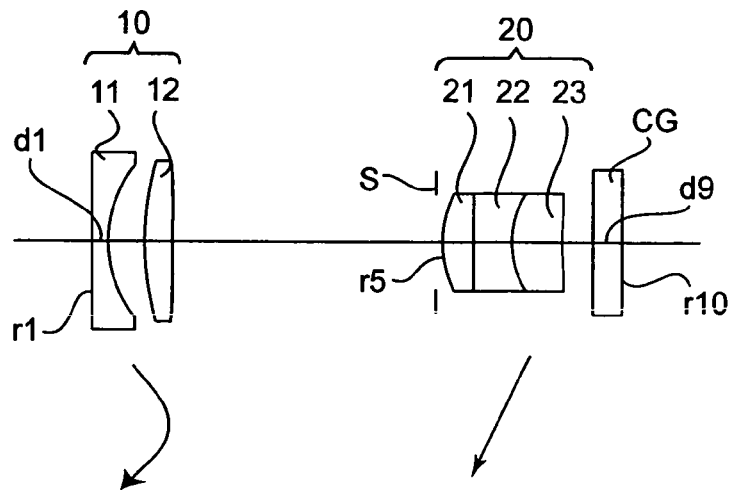
FIG. 29 is a lens arrangement of the zoom lens system according to an eighth embodiment of the present invention.
Figure 30A:
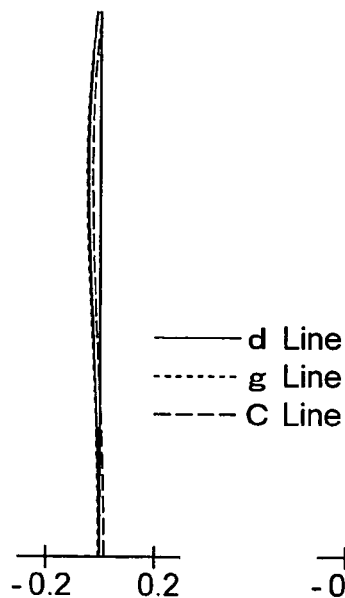
FIGS. 30A, 30B, 30C and 30D show aberrations occurred in the lens arrangement shown in FIG. 29, at the short focal length extremity.
Figure 30B:
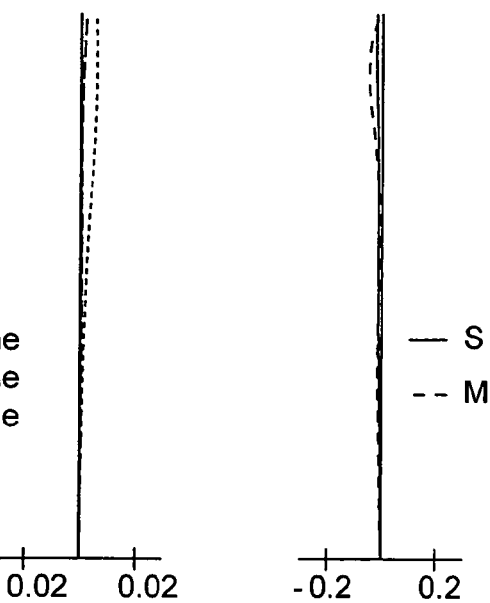
Figure 30C:
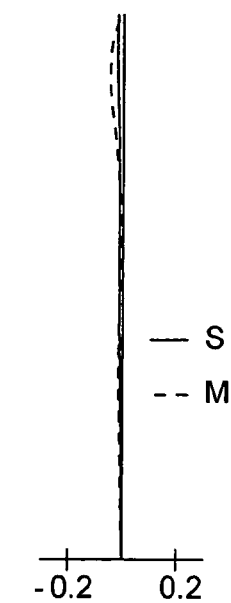
Figure 30D:
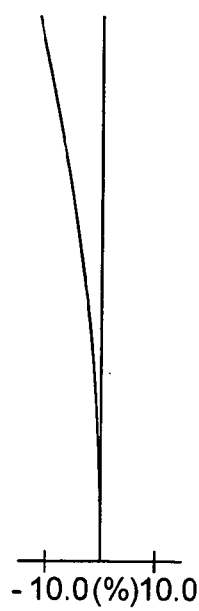
Figure 31A:
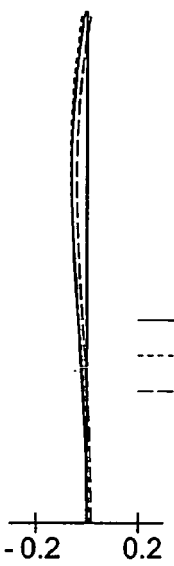
FIGS. 31A, 31B, 31C and 31D show aberrations occurred in the lens arrangement shown in FIG. 29, at an intermediate focal length.
Figure 31B:
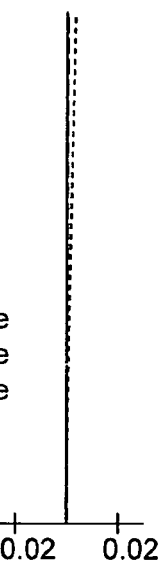
Figure 31C:
Figure 31D:
Figure 32A:
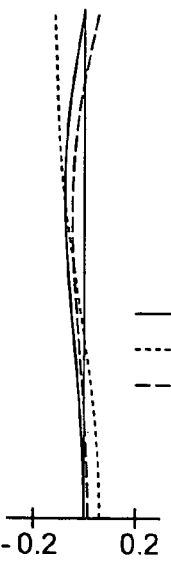
FIGS. 32A, 32B, 32C and 32D show aberrations occurred in the lens arrangement shown in FIG. 29, at the long focal length extremity.
Figure 32B:
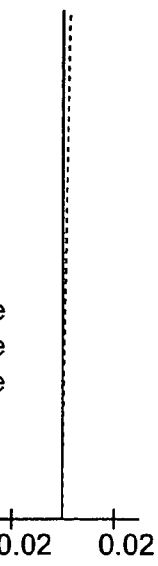
Figure 32C:
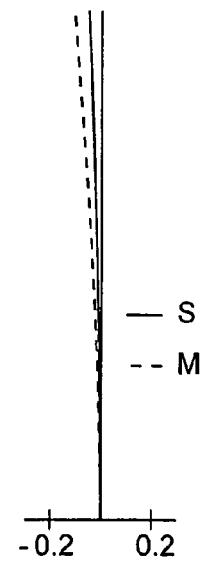
Figure 32D:
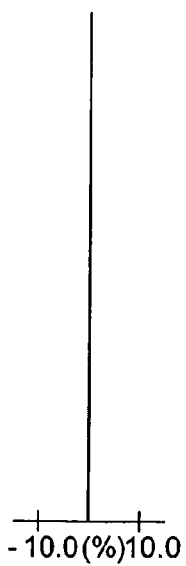
Figure 33:
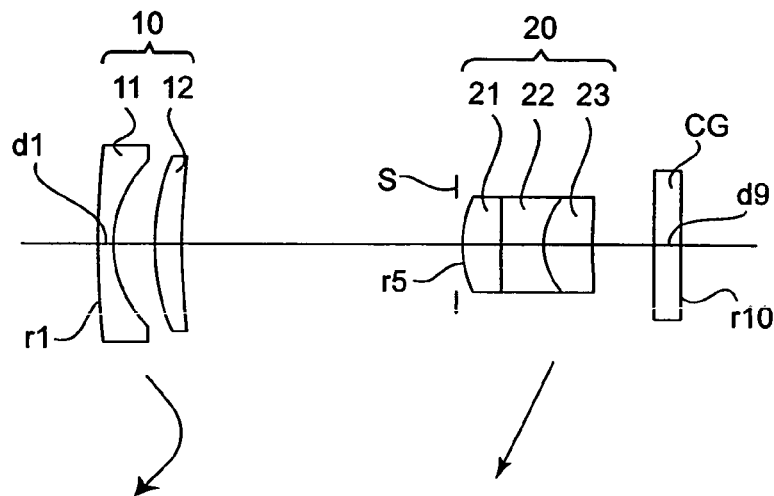
FIG. 33 is a lens arrangement of the zoom lens system according to a ninth embodiment of the present invention.
Figure 34A:
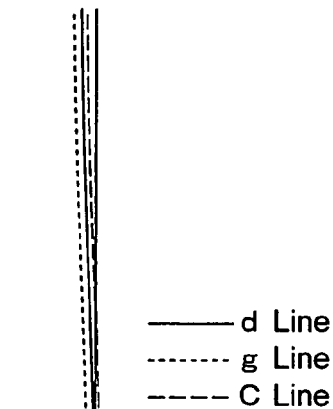
FIGS. 34A, 34B, 34C and 34D show aberrations occurred in the lens arrangement shown in FIG. 33, at the short focal length extremity.
Figure 34B:
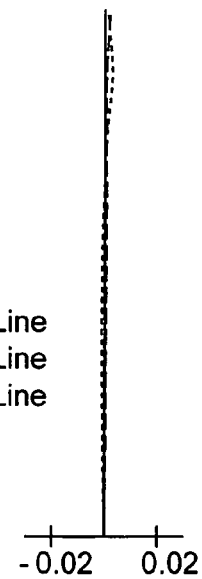
Figure 34C:
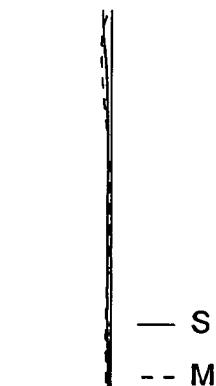
Figure 34D:
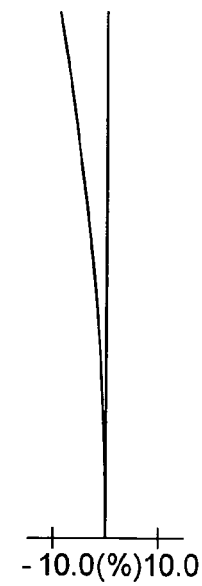

As shown FIG. 1 (the first embodiment), FIG. 5 (the second embodiment), FIG. 9 (the third embodiment), FIG. 13 (the fourth embodiment), FIG. 17 (the fifth embodiment), FIG. 21 (the sixth embodiment), FIG. 25 (the seventh embodiment), FIG. 29 (the eighth embodiment), and FIG. 33 (the ninth embodiment), the zoom lens system of the present invention includes a negative first lens group 10, a diaphragm S, and a positive second lens group 20, in this order from the object.

The diaphragm S moves together with the positive second lens group 20.

Upon zooming from the short focal length extremity to the long focal path length extremity, in the first embodiment (FIG. 1), the negative first lens group 10 moves monotonically toward the image; and in the second through ninth embodiments, the negative first lens group 10 moves toward the image, and thereafter moves toward the object.

The positive second lens group 20 moves monotonically toward the object in each of the first through ninth embodiments.

Focusing is performed by the first lens group 10.

The negative first lens group 10 includes a negative lens element 11 and a positive lens element 12, in this order from the object.

The second lens group 20 includes a positive lens element 21, a negative lens element 22, and a positive lens element 23, in this order from the object.

More specifically, in the first to third embodiments (FIGS. 1, 5 and 9), the positive lens element 21 (the object-side positive lens element) and the negative lens element 22 are formed as cemented lens elements.

In the fourth to the ninth embodiments (FIGS. 13, 17, 21, 25, 29 and 33), all of the positive lens element 21, the negative lens element 22 and the positive lens element 23 (the image-side positive lens element) are cemented.

A cover glass (filter group) CG is provided in front of an imaging device.

Condition (1) relates to the ratio of the focal length of the positive second lens group 20 to the zoom ratio of the entire zoom lens system. This condition is to suitably determine the refractive power of the positive second lens group 20 which is arranged to shoulder a larger portion of zooming function in the zoom lens system. Also condition (1) is to reduce fluctuation of aberrations upon zooming.

If $f_{2G}/(f_T/f_W)$ exceeds the upper limit of condition (1), the refractive power of the positive second lens group 20 becomes too weak, so that the traveling distance of the positive second lens group 20 from the short focal length extremity toward the long focal length extremity becomes longer. Consequently, the overall length of the zoom lens system becomes longer.

If $f_{2G}/(f_T/f_W)$ exceeds the lower limit of condition (1), the refractive power of the positive second lens group 20 becomes too strong, and the traveling distance of the positive second lens group 20 from the short focal length extremity toward the long focal length extremity becomes shorter. However, fluctuation of aberrations upon zooming becomes larger, so that the correcting of aberrations becomes difficult.

Furthermore, if an attempt is made to increase the number of lens elements of the positive second lens group 20 for the correcting of aberrations, the overall length of the zoom lens system becomes longer, and the diameter thereof also becomes larger.

Condition (2) specifies the ratio of the traveling distance of the positive second lens group 20 from the short focal length extremity toward the long focal length extremity to the zoom ratio of the entire zoom lens system.

If $f_{2G}(m_W-m_T)/(f_T/f_W)$ exceeds the upper limit of condition (2), the traveling distance of the positive second lens group 20 from the short focal length extremity toward the long focal length extremity becomes longer. Consequently, at the long focal length extremity, the positive second lens group 20 interferes with the negative first lens group 10; as a result, the zoom lens system cannot be mechanically constituted.

If $f_{2G}(m_W-m_T)/(f_T/f_W)$ exceeds the lower limit of condition (2), the traveling distance of the positive second lens group 20 from the short focal length extremity toward the long focal length extremity becomes shorter. However, fluctuation of aberrations becomes larger upon zooming. Consequently, the correcting of spherical aberration becomes particularly difficult.

Condition (3) specifies the ratio of the focal length of the negative first lens group 10 to the focal length of the positive second lens group 20.

If $|f_{1G}|/f_{2G}$ exceeds the upper limit of condition (3), the traveling distance of the negative first lens group 10 from the short focal length extremity toward the long focal length extremity becomes longer, so that the overall length of the zoom lens system becomes longer.

If $|f_{1G}|/f_{2G}$ exceeds the lower limit of condition (3), the negative refractive power of the negative first lens group 10 becomes too strong with respect to the positive refractive power of the positive second lens group 20. Consequently, various aberrations occur, and the correcting of distortion by the positive second lens group 20 becomes particularly difficult.

Condition (4) specifies the difference in the Abbe number of the d-line with respect to the negative lens element 22 and the image-side positive lens element 23 of the positive second lens group 20.

Throughout the embodiments, the positive second lens group 20 includes the three lens elements, i.e., a relatively small number of lens elements. Therefore it is preferable that the positive lens element 23 and the negative lens element 22 to be cemented be made from glass materials by which the difference in the Abbe numbers between the negative lens element 22 and the image-side positive lens element 23 can be made larger to the extent that these glass materials satisfy condition (4).

If the glass materials do not satisfy condition (4), it becomes difficult to correct chromatic aberration suitably.

Furthermore, in the case where all the three lens elements (21, 22 and 23) are cemented, the positive second lens group 20 of the zoom lens system preferably satisfies condition (4') in order to suitably correct chromatic aberration as in the case of the cemented two lens elements of the positive second lens group 20 to which condition (4) is applied.

Figure 37:
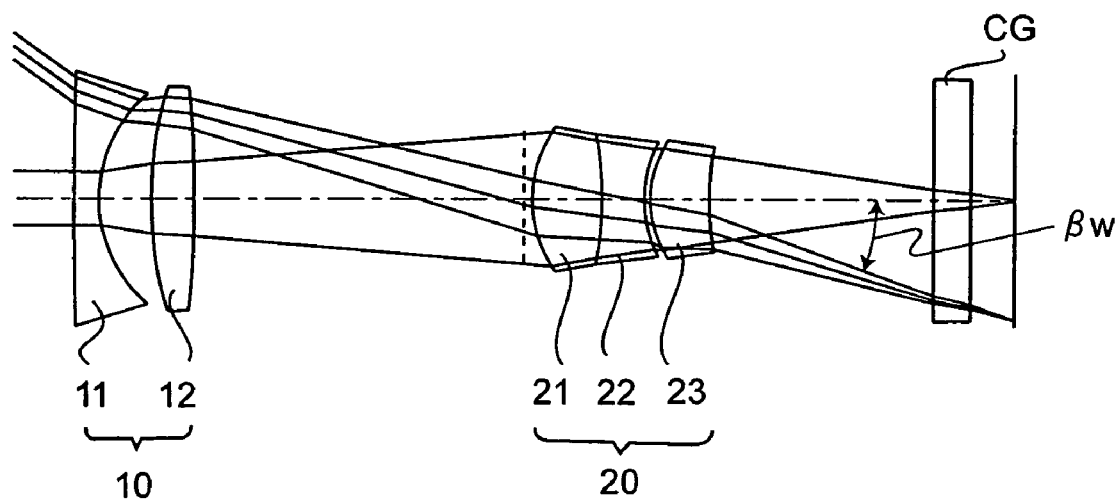
FIG. 37 is a schematic view for explaining the exit angle βw.

Condition (5) specifies the exit angle ($\beta_W$), at the short focal length extremity, formed by the optical axis and the light ray closest thereto, in a bundle of off-axis light rays, which is emitted from the most image-side lens surface of the zoom lens system and corresponds to the highest image height, as shown in FIG. 37. In other words, the exit angle ($\beta_W$) relates to telecentricity of the zoom lens system.

If $\beta_W$ exceeds the upper limit of condition (5), a sate where the principal light rays are incident on the imaging surface at the right angle cannot be obtained; as a result, shading occurs.

If $\beta_W$ exceeds the lower limit of condition (5), the back focal distance at the short focal length extremity becomes longer. Consequently, the overall length of the zoom lens system becomes longer, and the diameter thereof becomes larger.

Condition (6) specifies the difference in the exit angles at the short focal length extremity and the long focal length extremity. Similar to condition (5), this condition also relates to telecentricity of the zoom lens system.

If $\beta_W - \beta_T$ exceeds the upper limit of condition (6), the difference in the exit angles at the short focal length extremity and the long focal length extremity becomes larger; and as a result, shading occurs.

In the case where all the three lens elements of the positive second lens group 20 are cemented, the zoom lens system preferably satisfies condition (6') which has a lower limit in addition to the upper limit.

If $\beta_W - \beta_T$ exceeds the lower limit of condition (6'), the back focal distance at the short focal length extremity becomes longer. Consequently, the overall length of the zoom lens system becomes longer, and the diameter thereof becomes larger.

Condition (7) specifies the radius of curvature of the cemented surface of the image-side two lens elements of the positive second lens group 20 in the case where all the three lens elements of the positive second lens group 20 are cemented, i.e., the cemented surface between the negative lens element 22 and the positive lens element 23 of the positive second lens group 20.

If the radius of curvature of the cemented surface between the negative lens element 22 and the positive lens element 23 becomes smaller to the extent that $(N_n - N_p)/r_{c2}$ exceeds the upper limit of condition (7), the refractive power of the cemented surface becomes too strong, so that the correcting of aberrations becomes difficult.

Condition (8) specifies the radius of curvature of the cemented surface of the object-side two lens elements in the case where all the three lens elements of the positive second lens group 20 are cemented, i.e., the cemented surface between the positive lens element 21 and the negative lens element 22 of the positive second lens group 20.

The image-side surface of the positive lens element 21, i.e., the cemented surface, can be either formed as a concave surface or a convex surface from the viewpoint of the correcting of aberrations. On the other hand, if a manufacturing error is considered, it is preferable that the cemented surface be formed as a concave surface.

If the image-side surface of the positive lens element 21, i.e., the cemented surface, is formed as convex surface, decentration tends to occur easily since a reference lens element is changed to another one during the cementing process.

Condition (9) specifies the zoom ratio of the entire zoom lens system. Even in the case of the zoom lens system satisfying condition (9) by cementing all the three lens elements (21, 22 and 23) of the positive second lens group 20, spherical aberration and astigmatism can be suitably corrected in all the zooming ranges.

Specific numerical data of the embodiments will be described hereinafter.

In the diagrams of chromatic aberration (axial chromatic aberration) represented by spherical aberration, the solid line and the two types of dotted lines respectively designate spherical aberrations with respect to the d, g and C lines.

In the diagrams of lateral chromatic aberration, the two types of dotted lines respectively designate magnification with respect to the g and C lines; however, the d line as the base line coincides with the ordinate.

In the diagrams of astigmatism, S designates the sagittal image, and M designates the meridional image.

In the tables, $F_{NO}$ designates the f-number, f designates the focal length of the zoom lens system, W designates the half angle-of-view (°), fB designates the back focal distance (the distance from the image-side surface of the cover glass to the imaging surface), r designates the radius of curvature, d designates the lens-element thickness or distance between lens elements, Nd designates the refractive index of the d-line, and ν designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:

c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

[Embodiment 1]

FIG. 1 is the lens arrangement of the zoom lens system according to the first embodiment of the present invention. FIGS. 2A through 2D show aberrations occurred in the lens arrangement shown in FIG. 1, at the short focal length extremity. FIGS. 3A through 3D show aberrations occurred in the lens arrangement shown in FIG. 1, at an intermediate focal length. FIGS. 4A through 4D show aberrations occurred in the lens arrangement shown in FIG. 1, at the long focal length extremity. Table 1 shows the numerical data of the first embodiment.

The negative first lens group 10 includes a negative lens element 11 and a positive lens element 12, in this order from the object.

The positive second lens group 20 includes a positive lens element 21, a negative lens element 22, and a positive lens element 23, in this order from the object. The positive lens element 21 and the negative lens element 22 are cemented.

The diaphragm S is positioned 0.50 in front of the positive second lens group 20 (in front of surface No. 5).

TABLE 1

$F_{NO.}$ = 1:3.5–4.2–5.1
f = 4.50–7.00–10.00 (Zoom Ratio 2.22)
W = 36.0–23.0–16.2
fB = 1.04–1.04–1.04
Maximum Image Height = 2.9
$\beta_W$ = 20.7
$\beta_T$ = 18.5

| Surf. No. | r | d | Nd | ν |
|---|---|---|---|---|
| 1 | 125.000 | 0.60 | 1.78619 | 47.8 |
| 2 | 3.446 | 0.98 | — | — |
| 3* | 6.162 | 1.00 | 1.60585 | 27.0 |
| 4* | 50.043 | 6.99–3.00–0.84 | — | — |
| 5 | 3.420 | 1.46 | 1.77671 | 48.1 |
| 6 | −5.541 | 1.19 | 1.83400 | 32.4 |
| 7 | 3.176 | 0.38 | — | — |
| 8* | 2.489 | 1.37 | 1.6626 | 55.2 |
| 9* | 6.550 | 4.30–6.03–8.11 | — | — |
| 10 | ∞ | 0.90 | 1.51633 | 64.1 |
| 11 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 | A8 |
|---|---|---|---|
| 3 | $0.79607 \times 10^{-3}$ | $-0.10315 \times 10^{-3}$ | $0.73872 \times 10^{-5}$ |
| 4 | $-0.79657 \times 10^{-3}$ | $-0.16435 \times 10^{-3}$ | |
| 8 | $-0.34487 \times 10^{-4}$ | $-0.56528 \times 10^{-3}$ | |
| 9 | $0.17320 \times 10^{-1}$ | $0.26085 \times 10^{-2}$ | |

[Embodiment 2]

FIG. 5 is the lens arrangement of the zoom lens system according to the second embodiment of the present invention. FIGS. 6A through 6D show aberrations occurred in the lens arrangement shown in FIG. 5, at the short focal length extremity. FIGS. 7A through 7D show aberrations occurred in the lens arrangement shown in FIG. 5, at an intermediate focal length. FIGS. 8A through 8D show aberrations occurred in the lens arrangement shown in FIG. 5, at the long focal length extremity. Table 2 shows the numerical data of the second embodiment.

The basic lens arrangement of the second embodiment is the same as that of the first embodiment.

The diaphragm S is positioned 0.20 in front of the positive second lens group 20 (in front of surface No. 5).

TABLE 2

$F_{NO.}$ = 1:3.5–4.3–6.0
f = 4.50–7.00–12.60 (Zoom Ratio 2.80)
W = 35.4–22.9–13.0
fB = 1.07–1.07–1.07
Maximum Image Height = 2.9
$\beta_W$ = 20.9
$\beta_T$ = 15.4

| Surf. No. | r | d | Nd | ν |
|---|---|---|---|---|
| 1 | 125.000 | 0.60 | 1.83481 | 42.7 |
| 2 | 3.373 | 1.10 | — | — |
| 3* | 8.782 | 1.00 | 1.78472 | 25.7 |
| 4* | −417.163 | 7.60–3.65–0.50 | — | — |
| 5 | 3.248 | 1.45 | 1.73568 | 50.7 |
| 6 | −8.019 | 1.00 | 1.83400 | 34.1 |
| 7 | 2.711 | 0.16 | — | — |
| 8* | 2.441 | 1.70 | 1.6626 | 55.2 |
| 9* | 10.476 | 4.90–6.84–11.19 | — | — |
| 10 | ∞ | 0.90 | 1.51633 | 64.1 |
| 11 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 | A8 |
|---|---|---|---|
| 3 | $0.14695 \times 10^{-2}$ | $-0.13932 \times 10^{-3}$ | $0.13682 \times 10^{-4}$ |
| 4 | $-0.41476 \times 10^{-2}$ | $-0.16245 \times 10^{-3}$ | |
| 8 | $-0.27462 \times 10^{-2}$ | $0.31093 \times 10^{-3}$ | $-0.40000 \times 10^{-3}$ |
| 9 | $0.11926 \times 10^{-1}$ | $0.27719 \times 10^{-2}$ | $-0.20000 \times 10^{-3}$ |

[Embodiment 3]

FIG. 9 is the lens arrangement of the zoom lens system according to the third embodiment of the present invention. FIGS. 10A through 10D show aberrations occurred in the lens arrangement shown in FIG. 9, at the short focal length extremity. FIGS. 11A through 11D show aberrations occurred in the lens arrangement shown in FIG. 9, at an intermediate focal length. FIGS. 12A through 12D show aberrations occurred in the lens arrangement shown in FIG. 9, at the long focal length extremity. Table 3 shows the numerical data of the third embodiment.

The basic lens arrangement of the third embodiment is the same as that of the first embodiment.

The diaphragm S is positioned 0.20 in front of the positive second lens group 20 (in front of surface No. 5).

TABLE 3

$F_{NO.} = 1:3.4-4.2-6.1$
f = 4.40–7.00–13.20 (zoom Ratio 3.00)
W = 35.9–23.0–12.4
fB = 1.06–1.06–1.06
Maximum Image Height = 2.9
$\beta_W = 19.8$
$\beta_T = 15.4$

| Surf. No. | r | d | Nd | ν |
|---|---|---|---|---|
| 1 | 125.000 | 0.60 | 1.83400 | 40.9 |
| 2 | 3.352 | 1.26 | — | — |
| 3* | 12.151 | 1.00 | 1.84666 | 23.8 |
| 4* | −53.712 | 8.08–3.86–0.50 | — | — |
| 5 | 3.063 | 1.66 | 1.65000 | 58.6 |
| 6 | −8.125 | 1.00 | 1.83400 | 36.0 |
| 7 | 3.002 | 0.15 | — | — |
| 8* | 2.555 | 1.40 | 1.69350 | 53.2 |
| 9* | 10.328 | 5.40–7.57–12.74 | — | — |
| 10 | ∞ | 0.90 | 1.51633 | 64.1 |
| 11 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 | A8 |
|---|---|---|---|
| 3 | $0.14832 \times 10^{-2}$ | $-0.85178 \times 10^{-4}$ | $0.14804 \times 10^{-4}$ |
| 4 | $-0.41895 \times 10^{-3}$ | $-0.94808 \times 10^{-4}$ | |
| 8 | $-0.18419 \times 10^{-2}$ | $0.48973 \times 10^{-3}$ | $-0.40000 \times 10^{-3}$ |
| 9 | $0.13482 \times 10^{-1}$ | $0.25918 \times 10^{-2}$ | $-0.20000 \times 10^{-3}$ |

[Embodiment 4]

FIG. 13 is the lens arrangement of the zoom lens system according to the fourth embodiment of the present invention. FIGS. 14A through 14D show aberrations occurred in the lens arrangement shown in FIG. 13, at the short focal length extremity. FIGS. 15A through 15D show aberrations occurred in the lens arrangement shown in FIG. 13, at an intermediate focal length. FIGS. 16A through 16D show aberrations occurred in the lens arrangement shown in FIG. 13, at the long focal length extremity. Table 4 shows the numerical data of the fourth embodiment.

In the fourth embodiment, all the three lens elements (21, 22 and 23) of the positive second lens group 20 are cemented.

The diaphragm S is positioned 0.00 in front of the positive second lens group 20 (in front of surface No. 5).

TABLE 4

$F_{NO.} = 1:3.5-4.3-5.2$
f = 4.50–7.00–10.00 (Zoom Ratio 2.22)
W = 35.8–22.9–16.2
fB = 1.07–1.07–1.07
Maximum Image Height = 2.9
$\beta_W = 23.1$
$\beta_T = 18.9$

| Surf. No. | r | d | Nd | ν |
|---|---|---|---|---|
| 1 | 110.521 | 0.60 | 1.77500 | 41.6 |
| 2 | 3.406 | 1.19 | — | — |
| 3* | 8.556 | 0.86 | 1.84666 | 23.8 |
| 4* | 33.544 | 5.64–2.22–0.38 | — | — |
| 5* | 3.691 | 1.25 | 1.83400 | 45.2 |
| 6 | 50.000 | 1.42 | 1.81307 | 26.0 |
| 7 | 2.953 | 1.60 | 1.66626 | 55.2 |
| 8* | 28.773 | 4.20–5.97–8.09 | — | — |
| 9 | ∞ | 0.90 | 1.51633 | 64.1 |
| 10 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 |
|---|---|---|
| 3 | $-0.13116 \times 10^{-3}$ | $-0.19359 \times 10^{-3}$ |
| 4 | $-0.13566 \times 10^{-2}$ | $-0.27103 \times 10^{-3}$ |
| 5 | $-0.45073 \times 10^{-3}$ | $0.40000 \times 10^{-4}$ |
| 8 | $0.81004 \times 10^{-2}$ | $0.20000 \times 10^{-2}$ |

[Embodiment 5]

FIG. 17 is the lens arrangement of the zoom lens system according to the fifth embodiment of the present invention. FIGS. 18A through 18D show aberrations occurred in the lens arrangement shown in FIG. 17, at the short focal length extremity. FIGS. 19A through 19D show aberrations occurred in the lens arrangement shown in FIG. 17, at an intermediate focal length. FIGS. 20A through 20D show aberrations occurred in the lens arrangement shown in FIG. 17, at the long focal length extremity. Table 5 shows the numerical data of the fifth embodiment.

The basic lens arrangement of the fifth embodiment is the same as that of the fourth embodiment.

The diaphragm S is positioned 0.30 in front of the positive second lens group 20 (in front of surface No. 5).

TABLE 5

$F_{NO.} = 1:3.5-4.3-5.3$
f = 4.50–7.00–10.50 (Zoom Ratio 2.33)
W = 36.1–23.0–15.5
fB = 1.06–1.06–1.06
Maximum Image Height = 2.9
$\beta_W = 21.6$
$\beta_T = 18.0$

| Surf. No. | r | d | Nd | ν |
|---|---|---|---|---|
| 1 | 110.521 | 0.60 | 1.77500 | 42.9 |
| 2 | 3.448 | 1.12 | — | — |
| 3* | 8.666 | 0.85 | 1.84666 | 23.8 |
| 4* | 33.933 | 6.26–2.76–0.66 | — | — |
| 5* | 3.417 | 1.29 | 1.80661 | 46.5 |
| 6 | 50.000 | 1.06 | 1.83400 | 28.1 |
| 7 | 2.739 | 1.40 | 1.66626 | 55.2 |
| 8* | 20.949 | 4.60–6.41–8.94 | — | — |
| 9 | ∞ | 0.90 | 1.51633 | 64.1 |
| 10 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 |
|---|---|---|
| 3 | $-0.97801 \times 10^{-3}$ | $-0.23469 \times 10^{-3}$ |
| 4 | $-0.22414 \times 10^{-2}$ | $-0.28013 \times 10^{-3}$ |
| 5 | $-0.26377 \times 10^{-3}$ | $0.40000 \times 10^{-4}$ |
| 8 | $0.97742 \times 10^{-2}$ | $0.20000 \times 10^{-2}$ |

[Embodiment 6]

FIG. 21 is the lens arrangement of the zoom lens system according to the sixth embodiment of the present invention. FIGS. 22A through 22D show aberrations occurred in the lens arrangement shown in FIG. 21, at the short focal length extremity. FIGS. 23A through 23D show aberrations occurred in the lens arrangement shown in FIG. 21, at an intermediate focal length. FIGS. 24A through 24D show aberrations occurred in the lens arrangement shown in FIG. 21, at the long focal length extremity. Table 6 shows the numerical data of the sixth embodiment.

The basic lens arrangement of the sixth embodiment is the same as that of the fourth embodiment.

The diaphragm S is positioned 0.20 in front of the positive second lens group 20 (in front of surface No. 5).

TABLE 6

$F_{NO.} = 1:3.7-4.4-5.9$
f = 4.70–7.00–11.75 (Zoom Ratio 2.50)
W = 34.6–23.0–13.9
fB = 1.02–1.02–1.02
Maximum Image Height = 2.9
$\beta_W = 22.5$
$\beta_T = 16.6$

| Surf. No. | r | d | Nd | ν |
|---|---|---|---|---|
| 1 | ∞ | 0.50 | 1.85000 | 40.0 |
| 2 | 3.787 | 1.14 | — | — |
| 3* | 8.272 | 0.85 | 1.83293 | 24.1 |
| 4* | 48.250 | 6.92–3.43–0.54 | — | — |
| 5* | 3.352 | 1.17 | 1.81000 | 41.0 |
| 6 | 250.000 | 1.00 | 1.81836 | 24.6 |
| 7 | 3.153 | 1.35 | 1.58636 | 60.9 |
| 8* | 13.802 | 5.10–6.77–10.21 | — | — |
| 9 | ∞ | 0.90 | 1.51633 | 64.1 |
| 10 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 | A8 |
|---|---|---|---|
| 3 | $0.46256 \times 10^{-3}$ | $0.22543 \times 10^{-4}$ | $0.51293 \times 10^{-5}$ |
| 4 | $-0.50000 \times 10^{-3}$ | | |
| 5 | $-0.18802 \times 10^{-3}$ | $-0.13073 \times 10^{-4}$ | |
| 8 | $0.11451 \times 10^{-1}$ | $0.25577 \times 10^{-2}$ | $0.22000 \times 10^{-4}$ |

[Embodiment 7]

FIG. 25 is the lens arrangement of the zoom lens system according to the seventh embodiment of the present invention. FIGS. 26A through 26D show aberrations occurred in the lens arrangement shown in FIG. 25, at the short focal length extremity. FIGS. 27A through 27D show aberrations occurred in the lens arrangement shown in FIG. 25, at an intermediate focal length. FIGS. 28A through 28D show aberrations occurred in the lens arrangement shown in FIG. 25, at the long focal length extremity. Table 7 shows the numerical data of the seventh embodiment.

The basic lens arrangement of the seventh embodiment is the same as that of the fourth embodiment.

The diaphragm S is positioned 0.20 in front of the positive second lens group 20 (in front of surface No. 5).

TABLE 7

$F_{NO.} = 1:3.5-4.3-6.6$
f = 4.50–7.00–13.50 (Zoom Ratio 3.00)
W = 36.5–23.2–12.1
fB = 1.02–1.02–1.02
Maximum Image Height = 2.9
$\beta_W = 18.4$
$\beta_T = 14.8$

| Surf. No. | r | d | Nd | ν |
|---|---|---|---|---|
| 1 | ∞ | 0.50 | 1.88300 | 40.8 |
| 2 | 4.077 | 1.25 | — | — |
| 3* | 10.235 | 0.82 | 1.84666 | 23.8 |
| 4* | 165.059 | 8.58–4.24–0.49 | — | — |
| 5* | 3.696 | 1.11 | 1.83399 | 45.2 |
| 6 | 125.000 | 1.40 | 1.80330 | 29.2 |
| 7 | 2.678 | 1.40 | 1.58636 | 60.9 |
| 8* | 21.275 | 5.30–7.21–12.17 | — | — |
| 9 | ∞ | 0.90 | 1.51633 | 64.1 |
| 10 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 | A8 |
|---|---|---|---|
| 3 | $0.35360 \times 10^{-3}$ | $-0.20937 \times 10^{-3}$ | |
| 4 | $-0.56064 \times 10^{-3}$ | $-0.23605 \times 10^{-3}$ | |
| 5 | $-0.23869 \times 10^{-3}$ | $-0.37466 \times 10^{-4}$ | |
| 8 | $0.79475 \times 10^{-2}$ | $0.14570 \times 10^{-2}$ | $0.22000 \times 10^{-4}$ |

[Embodiment 8]

FIG. 29 is the lens arrangement of the zoom lens system according to the eighth embodiment of the present invention. FIGS. 30A through 30D show aberrations occurred in the lens arrangement shown in FIG. 29, at the short focal length extremity. FIGS. 31A through 31D show aberrations occurred in the lens arrangement shown in FIG. 29, at an intermediate focal length. FIGS. 32A through 32D show aberrations occurred in the lens arrangement shown in FIG. 29, at the long focal length extremity. Table 8 shows the numerical data of the eighth embodiment.

The basic lens arrangement of the eighth embodiment is the same as that of the fourth embodiment.

The diaphragm S is positioned 0.20 in front of the positive second lens group 20 (in front of surface No. 5).

TABLE 8

$F_{NO.} = 1:3.5-4.2-6.7$
f = 4.60–7.00–13.80 (Zoom Ratio 3.00)
W = 35.4–23.1–11.9
fB = 1.04–1.04–1.04
Maximum Image Height = 2.9
$\beta_W = 18.9$
$\beta_T = 14.7$

| Surf. No. | r | d | Nd | ν |
|---|---|---|---|---|
| 1 | ∞ | 0.50 | 1.88300 | 40.8 |
| 2 | 3.952 | 1.15 | — | — |
| 3* | 9.514 | 0.87 | 1.84666 | 23.8 |
| 4* | 219.244 | 8.57–4.41–0.49 | — | — |

TABLE 8-continued $F_{NO.} = 1:3.5-4.2-6.7$
f = 4.60–7.00–13.80 (Zoom Ratio 3.00)
W = 35.4–23.1–11.9
fB = 1.04–1.04–1.04
Maximum Image Height = 2.9
$\beta_W = 18.9$
$\beta_T = 14.7$

| Surf. No. | r | d | Nd | ν |
|---|---|---|---|---|
| 5* | 3.595 | 0.99 | 1.83400 | 45.2 |
| 6 | 125.000 | 1.24 | 1.83392 | 28.3 |
| 7 | 2.946 | 1.60 | 1.58636 | 60.9 |
| 8* | 17.684 | 5.10–6.92–12.08 | — | — |
| 9 | ∞ | 0.90 | 1.51633 | 64.1 |
| 10 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 | A8 |
|---|---|---|---|
| 3 | $0.45858 \times 10^{-3}$ | $-0.11575 \times 10^{-3}$ | $0.43280 \times 10^{-5}$ |
| 4 | $-0.61915 \times 10^{-3}$ | $-0.12546 \times 10^{-3}$ | |
| 5 | $-0.20734 \times 10^{-3}$ | $-0.31329 \times 10^{-4}$ | |
| 8 | $0.87631 \times 10^{-2}$ | $0.16974 \times 10^{-2}$ | $0.22000 \times 10^{-4}$ |

[Embodiment 9]

FIG. 33 is the lens arrangement of the zoom lens system according to the ninth embodiment of the present invention. FIGS. 34A through 34D show aberrations occurred in the lens arrangement shown in FIG. 33, at the short focal length extremity. FIGS. 35A through 35D show aberrations occurred in the lens arrangement shown in FIG. 33, at an intermediate focal length. FIGS. 36A through 36D show aberrations occurred in the lens arrangement shown in FIG. 33, at the long focal length extremity. Table 9 shows the numerical data of the ninth embodiment.

The basic lens arrangement of the ninth embodiment is the same as that of the fourth embodiment.

The diaphragm S is positioned 0.20 in front of the positive second lens group 20 (in front of surface No. 5).

TABLE 9

$F_{NO.} = 1:3.5-4.2-6.7$
f = 4.70–7.00–14.10 (Zoom Ratio 3.00)
W = 34.1–23.0–11.6
fB = 1.02–1.02–1.02
Maximum Image Height = 2.9
$\beta_W = 20.3$
$\beta_T = 14.7$

| Surf. No. | r | d | Nd | ν |
|---|---|---|---|---|
| 1 | 31.583 | 0.50 | 1.85000 | 40.0 |
| 2 | 3.912 | 1.34 | — | — |
| 3* | 8.149 | 0.89 | 1.84666 | 23.8 |
| 4* | 21.546 | 9.29–5.01–0.61 | — | — |
| 5* | 3.882 | 1.25 | 1.82305 | 45.7 |
| 6 | 250.000 | 1.40 | 1.74649 | 31.7 |
| 7 | 2.363 | 1.60 | 1.58636 | 60.9 |
| 8* | 18.868 | 5.30–6.99–12.19 | — | — |
| 9 | ∞ | 0.90 | 1.51633 | 64.1 |
| 10 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 | A8 |
|---|---|---|---|
| 3 | $0.34448 \times 10^{-3}$ | $-0.12838 \times 10^{-6}$ | $0.42197 \times 10^{-5}$ |
| 4 | $-0.50000 \times 10^{-3}$ | | |
| 5 | $-0.36281 \times 10^{-3}$ | $-0.19407 \times 10^{-4}$ | |
| 8 | $0.60287 \times 10^{-2}$ | $0.10162 \times 10^{-2}$ | $0.22000 \times 10^{-4}$ |

The numerical values of each condition of each embodiment are shown in Table 10.

TABLE 10

| | Embod. 1 | Embod. 2 | Embod. 3 | Embod. 4 | Embod. 5 | Embod. 6 | Embod. 7 | Embod. 8 | Embod. 9 |
|---|---|---|---|---|---|---|---|---|---|
| Cond. (1) | 2.66 | 2.22 | 2.15 | 2.48 | 2.42 | 2.41 | 2.15 | 2.17 | 2.23 |
| Cond. (2) | 1.72 | 2.25 | 2.45 | 1.75 | 1.83 | 2.04 | 2.29 | 2.33 | 2.30 |
| Cond. (3) | 1.44 | 1.29 | 1.20 | 1.41 | 1.38 | 1.38 | 1.31 | 1.32 | 1.36 |
| Cond. (4) | 22.8 | 21.1 | 17.2 | 29.2 | 27.1 | 36.2 | 31.7 | 32.6 | 29.2 |
| Cond. (5) | 20.7 | 20.9 | 19.8 | 23.1 | 21.6 | 22.5 | 18.4 | 18.9 | 20.3 |
| Cond. (6) | 2.16 | 5.48 | 4.35 | 4.16 | 3.56 | 5.85 | 3.59 | 4.15 | 5.55 |
| Cond. (7) | — | — | — | 0.05 | 0.06 | 0.07 | 0.08 | 0.08 | 0.07 |
| Cond. (8) | — | — | — | 50.0 | 50.0 | 250.0 | 125.0 | 125.0 | 125.0 |
| Cond. (9) | — | — | — | — | — | — | 3.00 | 3.00 | 3.00 |
| Cond. (4') | — | — | — | 29.2 | 27.1 | 36.2 | 31.7 | 32.6 | 29.2 |
| Cond. (6') | — | — | — | 4.16 | 3.56 | 5.85 | 3.59 | 4.15 | 5.55 |

Table 10 shows the following:

(i) all the first to ninth embodiments satisfy conditions (1) to (6);

(ii) conditions (7), (8), (4') (6') are applied to the fourth to ninth embodiments (i.e., all the three lens elements (21, 22 and 23) of the positive second lens group 20 are cemented), and these embodiments satisfy conditions (7), (8) (4') and (6'); and (iii) condition (9) is applied the seventh to ninth embodiments (i.e., all the three lens elements (21, 22 and 23) of the positive second lens group 20 are cemented; and the zoom ratio is 3.00), and these embodiments satisfy condition (9).

According to the above description, a zoom lens system with the following features can be obtained:

(a) superior optical performance with a smaller number of lens elements, i.e., the number of lens elements and optical performance are well balanced; and (b) a zoom ratio of approximately 3.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a negative first lens group and a positive second lens group, in this order from an object, wherein said negative first lens group comprises a negative lens element and a positive lens element, in this order from the object;

wherein said positive second lens group comprises a positive lens element, a negative lens element, and a positive lens element, in this order from the object;

wherein at least said object-side positive lens element and said negative lens element of said positive second lens group are cemented; and wherein said zoom lens system satisfies the following conditions:

$$1.5 < f_{2G}/(f_T f_W) < 3.0$$

$$1 < f_{2G}(m_W - m_T)/(f_T f_W) < 3$$

wherein $f_{2G}$ designates the focal length of said positive second lens group;

$f_T$ designates the focal length of the entire zoom lens system at the long focal length extremity;

$f_W$ designates the focal length of the entire zoom lens system at the short focal length extremity;

$m_W$ designates the lateral magnification of said positive second lens group at the short focal length extremity; and $m_T$ designates the lateral magnification of said positive second lens group at the long focal length extremity.

2. The zoom lens system according to claim 1, satisfying the following condition:

$$1.0 < f_{1G}/f_{2G} < 1.6$$

wherein $f_{1G}$ designates the focal length of said negative first lens group; and $f_{2G}$ designates the focal length of said positive second lens group.

3. The zoom lens system according to claim 1, satisfying the following condition:

$$15 < \nu p - \nu n$$

wherein $\nu p$ designates the Abbe number of said image-side positive lens element of said positive second lens group; and $\nu n$ designates the Abbe number of said negative lens element of said positive second lens group.

4. The zoom lens system according to claim 1, satisfying the following condition:

$$18° < \beta_W < 25°$$

wherein $\beta_W$ designates an exit angle, at the short focal length extremity, formed by the optical axis and the light ray closest thereto, in a bundle of off-axis light rays, which is emitted from the most image-side lens surface of said zoom lens system and corresponds to the highest image height.

5. The zoom lens system according to claim 1, satisfying the following condition:

$$\beta_W - \beta_T < 10°$$

wherein $\beta_W$ designates an exit angle, at the short focal length extremity, formed by the optical axis and the light ray closest thereto, in a bundle of off-axis light rays, which is emitted from the most image-side lens surface of said zoom lens system and corresponds to the highest image height; and $\beta_T$ designates an exit angle, at the long focal length extremity, formed by the optical axis and the light ray closest thereto, in a bundle of off-axis light rays, which is emitted from the most image-side lens surface of said zoom lens system and corresponds to the highest image height.

6. The zoom lens system according to claim 1, wherein all of said positive lens element, said negative lens element and said positive lens element of said positive second lens group are cemented; and wherein said cemented lens elements satisfy the following condition:

$$(N_n - N_p)/r_{c2} < 0.1$$

wherein $N_n$ designates the refractive index of the d-line with respect to said negative lens element of said positive second lens group;

$N_p$ designates the refractive index of the d-line with respect to said image-side positive lens element of said positive second lens group; and $r_{c2}$ designates the radius of curvature of a cemented surface between said negative lens element and said image-side positive lens element of said positive second lens group.

7. The zoom lens system according to claim 6, satisfying the following condition:

$$0 < r_{c1}$$

wherein $r_{c1}$ designates the radius of curvature of a cemented surface between said object-side positive lens element and said negative lens element of said positive second lens group.

8. The zoom lens system according to claim 6, satisfying the following condition:

$$20 < \nu p - \nu n$$

wherein
- $\nu p$ designates the Abbe number of said image-side positive lens element of said positive second lens group; and
- $\nu n$ designates the Abbe number of said negative lens element of said positive second lens group.

9. The zoom lens system according to claim 6, satisfying the following condition:

$$2.8 \leq f_T/f_W$$

wherein
- $f_T$ designates the focal length of the entire zoom lens system at the long focal length extremity; and
- $f_W$ designates the focal length of the entire zoom lens system at the short focal length extremity.

10. The zoom lens system according to claim 6, satisfying the following condition:

$$3° < \beta_W - \beta_T < 10°$$

wherein
- $\beta_W$ designates an exit angle, at the short focal length extremity, formed by the optical axis and the light ray closest thereto, in a bundle of off-axis light rays, which is emitted from the most image-side lens surface of said zoom lens system and corresponds to the highest image height; and
- $\beta_T$ designates an exit angle, at the long focal length extremity, formed by the optical axis and the light ray closest thereto, in a bundle of off-axis light rays, which is emitted from the most image-side lens surface of said zoom lens system and corresponds to the highest image height.

* * * * *